US006750561B2

(12) United States Patent
Hirai et al.

(10) Patent No.: US 6,750,561 B2
(45) Date of Patent: Jun. 15, 2004

(54) PROTECTING DEVICE

(75) Inventors: Hiroki Hirai, Nagoya (JP); Kouji Ota, Nagoya (JP); Yoshiyuki Miyazaki, Nagoya (JP); Eriko Yuasa, Yokkaichi (JP); Shuji Yamakawa, Yokkaichi (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 229 days.

(21) Appl. No.: 10/117,034

(22) Filed: Apr. 8, 2002

(65) Prior Publication Data
US 2002/0145340 A1 Oct. 10, 2002

(30) Foreign Application Priority Data
Apr. 10, 2001 (JP) ......................... 2001-111167

(51) Int. Cl.[7] ................................................ H02H 7/17
(52) U.S. Cl. ..................................................... 307/10.7
(58) Field of Search ................. 307/9.1, 10.1, 307/10.2, 10.7

(56) References Cited

U.S. PATENT DOCUMENTS

| 5,107,244 | A | * | 4/1992 | Minamide et al. ..... 340/426.34 |
| 5,870,018 | A | * | 2/1999 | Person et al. ............... 340/5.65 |
| 6,005,700 | A | * | 12/1999 | Pressler et al. .............. 398/117 |
| 6,534,883 | B2 | * | 3/2003 | Yoshida et al. ............. 307/10.1 |

* cited by examiner

Primary Examiner—Adolf Berhane
(74) Attorney, Agent, or Firm—Oliff & Berridge, PLC

(57) ABSTRACT

A fixed member 11 is provided with an input terminal 2 to be connected with a battery 100 and an output terminal 9 to be connected with an electric load 101. A movable member 12 is provided with the first current pass 4 that has connecting terminals 1 and 8 to be connected with the terminal members 2 and 9 respectively in a state where the movable member 12 is attached to the fixed member 11. The fixed member 11 is provided with the second current pass 15 for connecting the terminals 2 and 9 separately from the first current pass 4, and terminal protecting contacts 30 and 31 included in the second current pass 15.

5 Claims, 39 Drawing Sheets

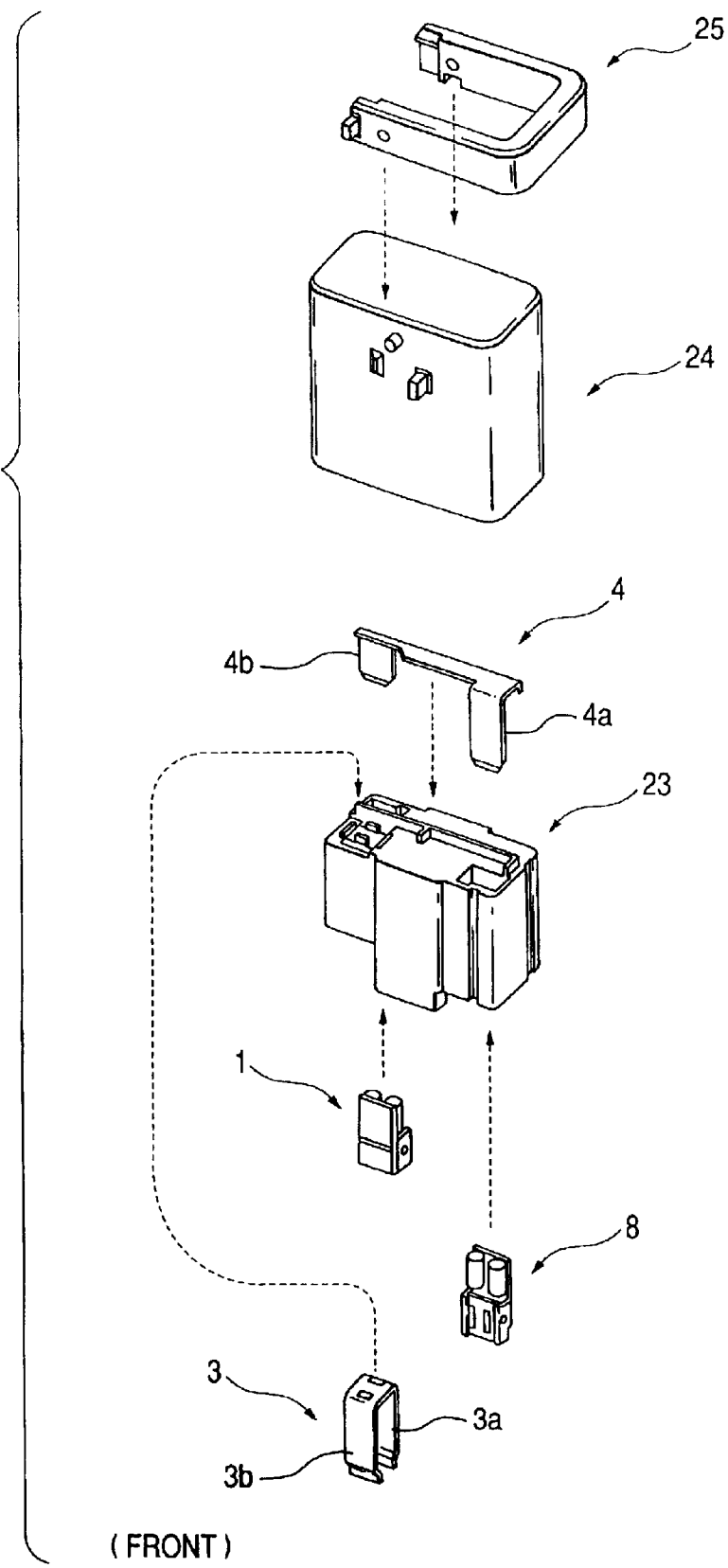

(FRONT)

(FRONT)

(FRONT)

(FRONT)

(FRONT)

PROTECTING DEVICE

BACKGROUND OF THE INVENTION

The present invention relates to a protecting device to be provided, for example, between an on-vehicle power source and an on-vehicle electric load, for cutting off power supply from the power source to the on-vehicle electric load on such an occasion as inspection of the load.

When executing maintenance services for various electric products like a radio or navigation system mounted on a vehicle it is not desirable to perform work while a voltage from a battery remains applied to the appliances.

In other words, from the viewpoint of safety it is desirable to isolate all the electric products from the power source prior to executing the maintenance work, for instance, by disconnecting from the power source wires that are directly connected to the power source such as a battery etc.

Accordingly, such techniques have recently been developed as providing close to a power source a protecting device comprising terminals in mutual contact that can be separated for disconnecting the power supply to each electric load, so that when executing maintenance work the terminals of the protecting device can be separated to cut off the power supply to each load.

In the protecting device that cuts off the power in the proximity of the battery as above, the terminals are tend to being damaged due to an arc that flies when separating the terminals because the power is relatively great. Especially, batteries recently have a higher rated voltage, creating an increasing demand for a technique to prevent damage to terminals due to arcing.

SUMMARY OF THE INVENTION

In view of the foregoing problem in the prior art, the invention provides a protecting device that produces an arc when isolating an electric load from the power source at a different point from the terminals for connecting the power source and the electric load, so that the terminals can be protected.

The present invention provides a protecting device comprising a fixed member to be fixed on a vehicle and a movable member that can be attached to or removed from the fixed member for cutting off power supply from an on-vehicle power source to each electric load by removing the movable member from the fixed member, wherein the fixed member is provided with an input terminal connected to the on-vehicle power source and an output terminal connected to each electric load; the movable member is provided with a first current pass that has movable side connecting terminals on its ends to be respectively connected to the input terminal and the output terminal in a state where the movable member is attached to the fixed member; the fixed member is also provided with a second current pass connecting the input terminal with the output terminal separately from the first current pass; the second current pass is provided with terminal protecting contacts during midstream that can make mutual contact; further, means for switching current is provided for breaking a current on the second current pass in a state where the movable member is attached to the fixed member and passing a current through the second current pass in a state where the movable member is removed from the fixed member but before the input terminal and the output terminal are separated from the movable side connecting terminals; and the terminal protecting contacts make mutual contact in a state where the movable member is attached to the fixed member and separate from each other in a state where the movable member is removed from the fixed member but after the current switching means has switched the second current pass from off to on.

In this device, in a state where the movable member is attached to the fixed member with the input terminal and the output terminal respectively connected to the on-vehicle power source and to each of the electric loads, the input terminal and the output terminal are connected through the first current pass on the movable member, enabling power supply to each of the electric loads. At this stage the terminal protecting contacts are mutually contacting, however, since the second current pass is disconnected by the current switching means the power is being supplied exclusively through the first current pass.

Upon starting a removing action of the movable member under this state, first the current switching means turns on the second current pass, therefore the power source and the electric loads are connected through both the first current pass and the second current pass. Then the movable side connecting terminals are separated from the input terminal and the output terminal so that the first current pass becomes disconnected, however, at this moment an arc will not fly between the input and output terminals and the movable side connecting terminals since the power source and the electric load remain connected through the second current pass, therefore these terminals are effectively protected. Following this the terminal protecting contacts separate from each other, at which time an arc will fly between the terminal protecting contacts in a case where the power is large.

Accordingly, if an arc ever flies it is only between the terminal protecting contacts, and since an arc will not fly between the input and output terminals and the movable side connecting terminals, these terminals are securely protected. Consequently the device also provides a solution for increasing voltage of the power source.

Here, it is preferable that the terminal protecting contacts are made of a material that has a greater arc resistance than the input terminal and the output terminal. As a result the terminal protecting contacts can be used for a prolonged period with less frequency of maintenance work. Also, materials with a greater arc resistance, for example, Ag—CdO family materials, Ag—Ni family materials, Ag-metal-oxide family materials, Ag—Gr family materials, etc., have a greater resistance than materials generally used for electric connection such as copper, however, since the second current pass is disconnected by the current switching means so that power is supplied to each electric load exclusively through the first current pass in a state where the movable member is attached to the fixed member, a greater resistance of the terminal protecting contacts will not cause any disturbance with the power supply.

Further, it is also preferable to provide a condenser in parallel with the terminal protecting contacts, because arc discharge between the terminal protecting contacts can be restrained by a condensing effect of the condenser, and resultantly the life span of the contacts can be prolonged. In this case also, since the second current pass including the condenser is disconnected by the current switching means while the power is supplied to each electric load, there will be no disturbance in the power supply.

Regarding the configuration for connecting the terminal protecting contacts, it is preferable to dispose the contacts on elastically deformable spring pieces formed in such a manner that the terminal protecting contacts remain separated in a natural state where an external force is not subjected to the spring pieces, and to provide an operating section on the movable member that forces the terminal protecting contacts to contact with each other in a state where the movable member is attached to the fixed member.

By a construction, the terminal protecting contacts will remain separated due to the natural shape of the spring pieces in a state where the movable member is not attached to the fixed member. And once the movable member is attached to the fixed member the operating section will cause an elastic deformation of each spring piece, thus forcing the terminal protecting contacts to contact with each other.

Further, it is preferable that the current switching means comprises of a pair of current switching terminals that are separated and included in the second current pass and a connecting conductor located on the movable member that becomes separated from at least one of the current switching terminals in a state where the movable member is attached to the fixed member but that contacts with both of the current switching terminals at least in a state where the terminal protecting contacts are separated from each other, to achieve electric connection between the current switching terminals.

According to this configuration, current switching operation on the second current pass can be properly performed by a simple construction of only a pair of current switching terminals and a connecting conductor that can contact with and separate from the current switching terminals.

BRIEF DESCRIPTION OF THE DRAWINGS

FIG. 2 is an exploded perspective view showing a movable member comprising the protecting device according to the embodiment of the invention.

DETAILED DESCRIPTION OF THE PREFERRED EMBODIMETNS

The embodiments of the present invention shall be described in detail hereunder.

Figure 1A:
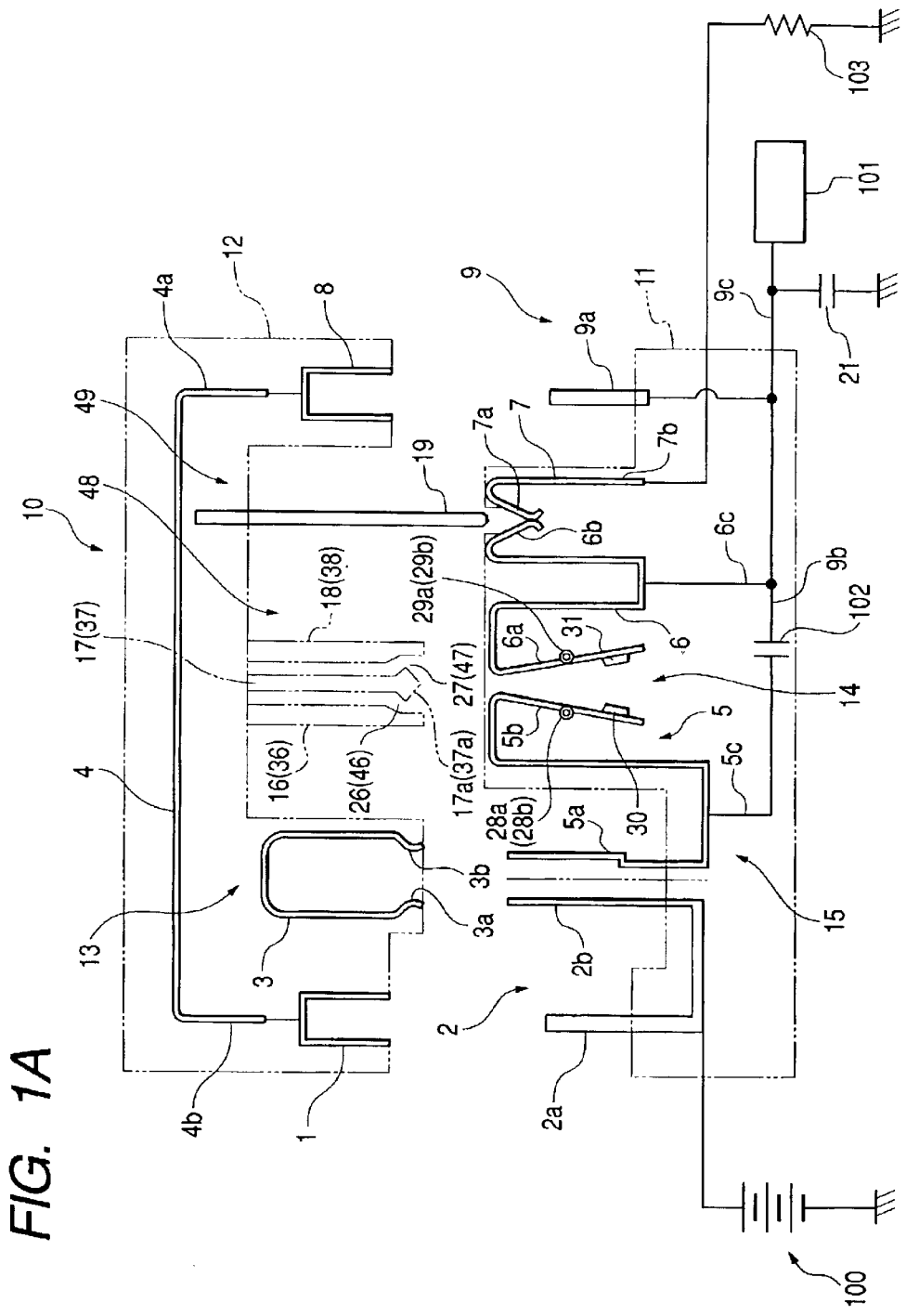
FIG. 1A is a schematic circuit diagram showing a circuit configuration of a protecting device according to the embodiment of the present invention.
Figure 1B:
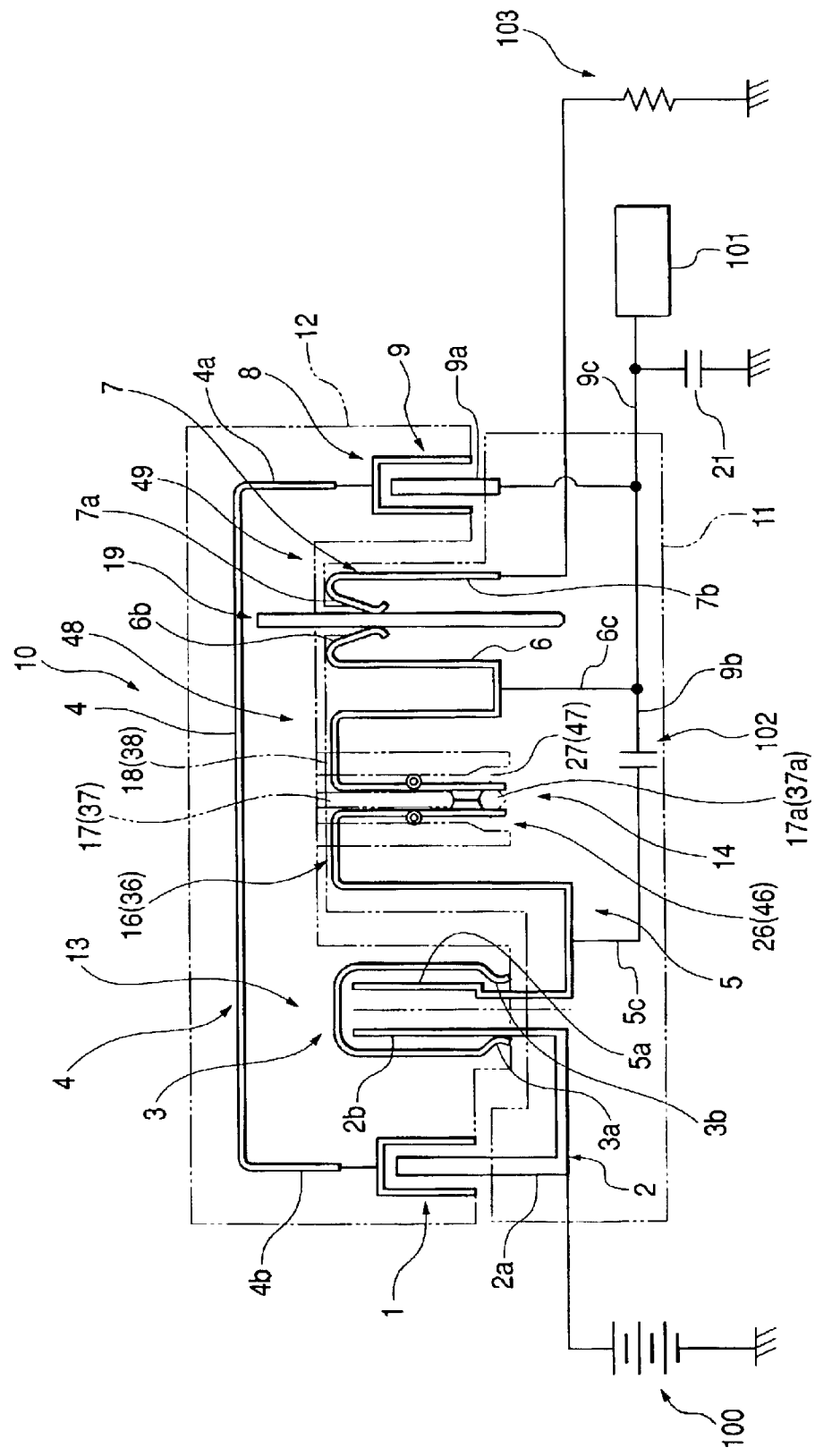
FIG. 1B is a schematic circuit diagram showing a circuit configuration of the protecting device according to the embodiment of the invention.

FIGS. 1A and 1B are schematic circuit diagrams showing a circuit configuration of a protecting device according to the embodiment of the invention.

The protecting device 10 is located between a battery 100 of a rated voltage of, for example, 42V serving as an on-vehicle power source and an electric load 101 such as a radio or navigation system etc., and comprising of a fixed member 11 mounted on a vehicle in a fixed manner and a movable member 12 that can be attached to and removed from the fixed member 11. The electric load 101 can be either singular or plural. Hereafter, a state where the movable member 12 is attached to the fixed member 11 as FIG. 1B shall be referred to as "attached state", and a state where the movable member 12 is separated from the fixed member 11 as FIG. 1A as "removed state".

The fixed member 11 is provided with an input terminal 2 to be connected with the battery 100, an output terminal 9 and a terminal member 6 to be connected with the electric load 101, and a terminal member 5 to be connected with the electric load 101 through a condenser 102. Also, the terminal members 5 and 6 serve as the second current pass 15 for connecting the input terminal 2 with the output terminal 9.

On the other hand, the movable member 12 is provided with a movable side connecting terminal 1 to be connected with the terminal 2a of the input terminal 2 and another movable side connecting terminal 8 to be connected with a terminal 9a of the output terminal 9 in an attached state, and a conducting material 4 that serves as the first current pass for connecting the movable side connecting terminals 1 and 8, and also a connecting conductor 3.

Accordingly, in the attached state a voltage of the battery 100 is applied to the electric load 101 through the movable side connecting terminal 1 connected with the input terminal 2, the movable side connecting terminal 8 similarly connected with the output terminal 9 and the conducting material 4 working as the first current pass, while in a removed state the movable side connecting terminal 1 and the input terminal 2, and the movable side connecting terminal 8 and the output terminal 9 are separated.

A current switching terminal 2b of the input terminal 2 and a current switching terminal 5a of the terminal member 5 are projected outward and opposite to each other, in such a manner that terminals 3a and 3b of the connecting conductor 3 can contact with these current switching terminals 2b and 5a. Specifically, these current switching terminals 2b and 5a provided in the fixed member 11 and the connecting conductor 3 provided in the movable member 12 will operate as means for switching current 13 for supplying or cutting off the current through the second current pass 15, and the terminals 3a and 3b of the connecting conductor 3 are separated from the current switching terminals 2b and 5a in a removed state. On the other hand, when attaching the movable member 12 to the fixed member 11, the terminals 3a and 3b of the connecting conductor 3 contact with the current switching terminals 2b and 5a during the earlier stage of the attaching action, however, during the subsequent stage one of terminals 3b of the connecting conductor 3 becomes separated from the current switching terminal 5a while the other terminal 3a remains in contact with the current switching terminal 2b.

Also, the terminal members 5 and 6 are made of an elastically deformable spring material such as phosphor bronze, and the terminals 5b of the terminal member 5 and the terminal 6a of the terminal member 6 are designed to separate from each other in a natural state as an initial setting, and to serve as first means for contacting 14 that closes in the attached state and opens in the removed state. This first contacting means 14 is caused to open and close by guide grooves 26 and 27 formed between three descending pieces 16, 17 and 18 formed inside of the front of the movable member 12, and guide grooves 46 and 47 formed between three descending pieces 36, 37 and 38 formed inside of the rear of the movable member 12. These descending pieces 16 to 18 and 36 to 38 serve as an operating section 48 for forcing the terminals 5b and 6a to close due to an elastic deformation until the terminal protecting contacts 30 and 31 make mutual contact in a state where the movable member 12 is attached. The central descending pieces 17 and 37 have a thicker section 17a and 37a bulging toward both sides at the respective lower ends. The descending pieces 16 and 18 have a thinner section 16a and 18a formed in parallel with the thicker section 17a to keep the width of the guide grooves 26 and 27 constant, and the upper portions of the guide grooves 26 and 27 rather than the thicker section 17a and the thinner sections 16a and 18a are in parallel. Likewise, the descending pieces 36 and 38 have a thinner section 36a and 38a formed in parallel with the thicker section 37a to keep the width of the guide grooves 46 and 47 constant, and the upper portions of the guide grooves 46 and 47 rather than the thicker section 37a and the thinner sections 36a and 38a are in parallel.

Figure 4:
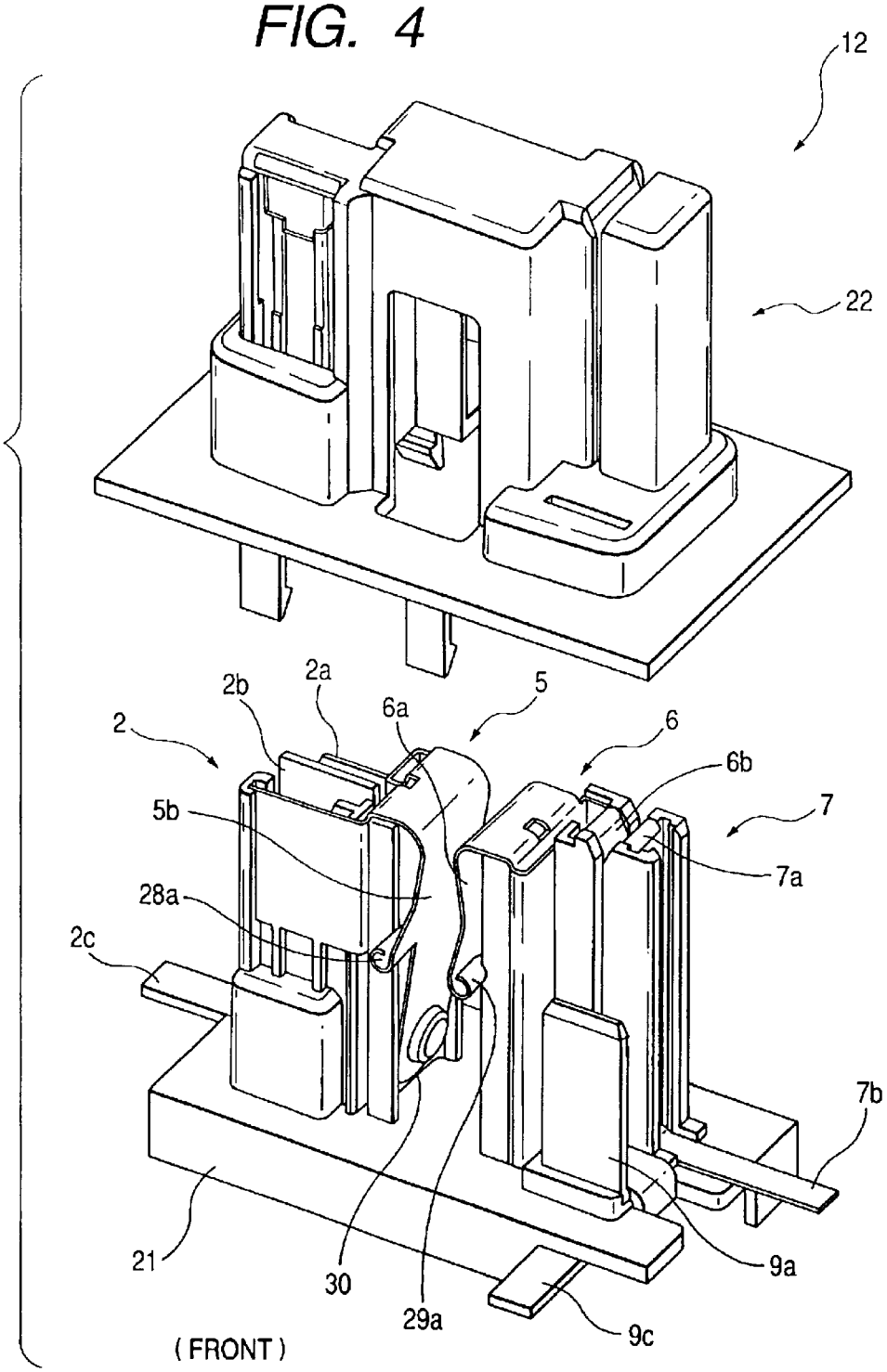
FIG. 4 is an exploded perspective view of the fixed member taken from the front side.
Figure 5:
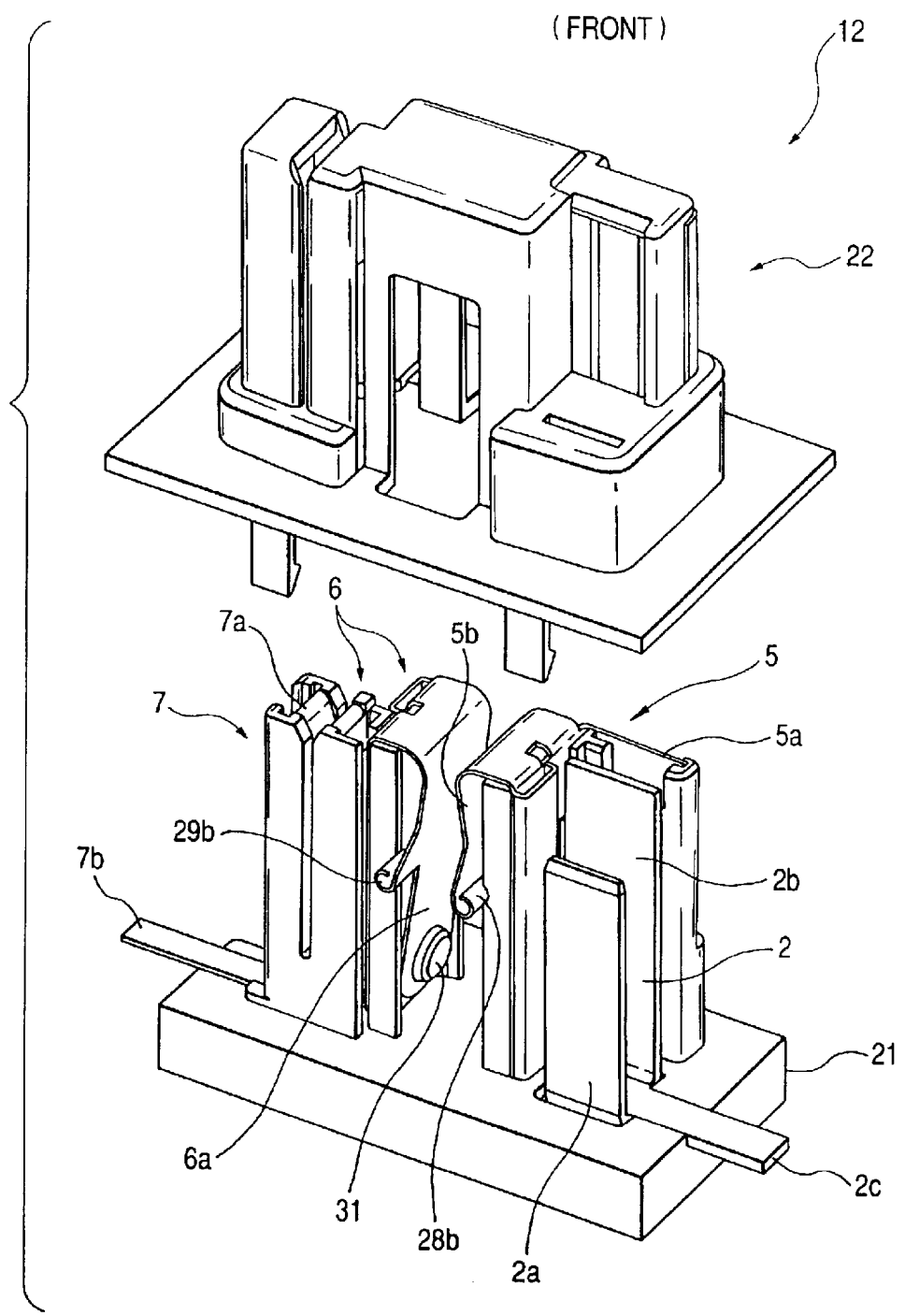
FIG. 5 is an exploded perspective view of the fixed member of FIG. 4 taken from the opposite obliquely rear side.

Specifically, as shown in FIG. 4 (a perspective view of the movable member 12 taken from the front side) to be later referred to, roll sections 28a and 29a projecting outward widthwise are formed halfway along the vertical direction on the front side of the terminals 5b and 6a, and as shown in FIG. 5 (a perspective view taken from the opposite rear side of FIG. 4) to be later referred to, roll sections 28b and 29b projecting outward widthwise are formed at the same level as the roll sections 28a and 29a along the vertical position on the rear side, and the terminal protecting contacts 30 and 31 are disposed at the lower end of the respective terminals 5b and 6a. The guide groove 26 between the descending pieces 16 and 17 guides the roll section 28a and the guide groove 27 between the descending pieces 17 and 18 guides the roll section 29a respectively, while the guide groove 46 between the descending pieces 36 and 37 guides the roll section 28b and the guide groove 47 between the descending pieces 37 and 38 guides the roll section 29b respectively.

In more detail, during a transition from a removed state to an attached state of the movable member 12, the roll sections 28a and 28b are guided along the guide grooves 26 and 46, and the roll sections 29a and 29b are guided along the guide grooves 27 and 47, after which, once the thicker section 17a has passed the roll sections 28a and 29a and the thicker section 37a has passed the roll sections 28b and 29b, the roll sections 28a and 29a are guided along the parallel portion of the guide grooves 26 and 27 and the roll sections 28b and 29b are guided along the parallel portion of the guide grooves 46 and 47, so that the terminals 5b and 6a, which were separated according to the initial setting, approach each other whereby the terminal protecting contacts 30 and 31 will contact with each other. On the contrary, during a transition from an attached state to a removed state of the movable member 12, the converse actions of the above take place until, finally, the terminals 5b and 6a become separated again according to the initial setting, and the terminal protecting contacts 30 and 31 also become separated. It is preferable to select a material for the terminal protecting contacts 30 and 31 from among those which have a greater arc resistance than materials generally used for electric connection (for example, copper), such as Ag—CdO family materials, Ag—Ni family materials, Ag-metal-oxide family materials, or Ag—Gr family materials, etc.

Further, the terminal 6c of the terminal member 6 is connected with the electric load 101 and the condenser 21 provided for the electric load 101, and the condenser 21 is grounded. The battery 100 and the electric load 101 are connected through the current switching means 13 and the first contacting means 14 disposed in the second current pass 15. Also, the condenser 102 is provided in parallel with the first contacting means 14.

Furthermore, the terminal 6b of the terminal member 6 can be either connected with or disconnected from the terminal 7a of the terminal member 7, and these terminals 6b and 7a constitute the second means for contacting 49. In the second contacting means 49 the terminals 6b and 7a are designed to close in a natural state as an initial setting, and the terminals 6b and 7a become disconnected in an attached state because of the descending wall 19 formed in the movable member 12, but return to the contacting state according to the initial setting, in a removed state. The terminal 7b of the terminal member 7 is connected with the discharge resistance 103, which is grounded.

Figure 3:
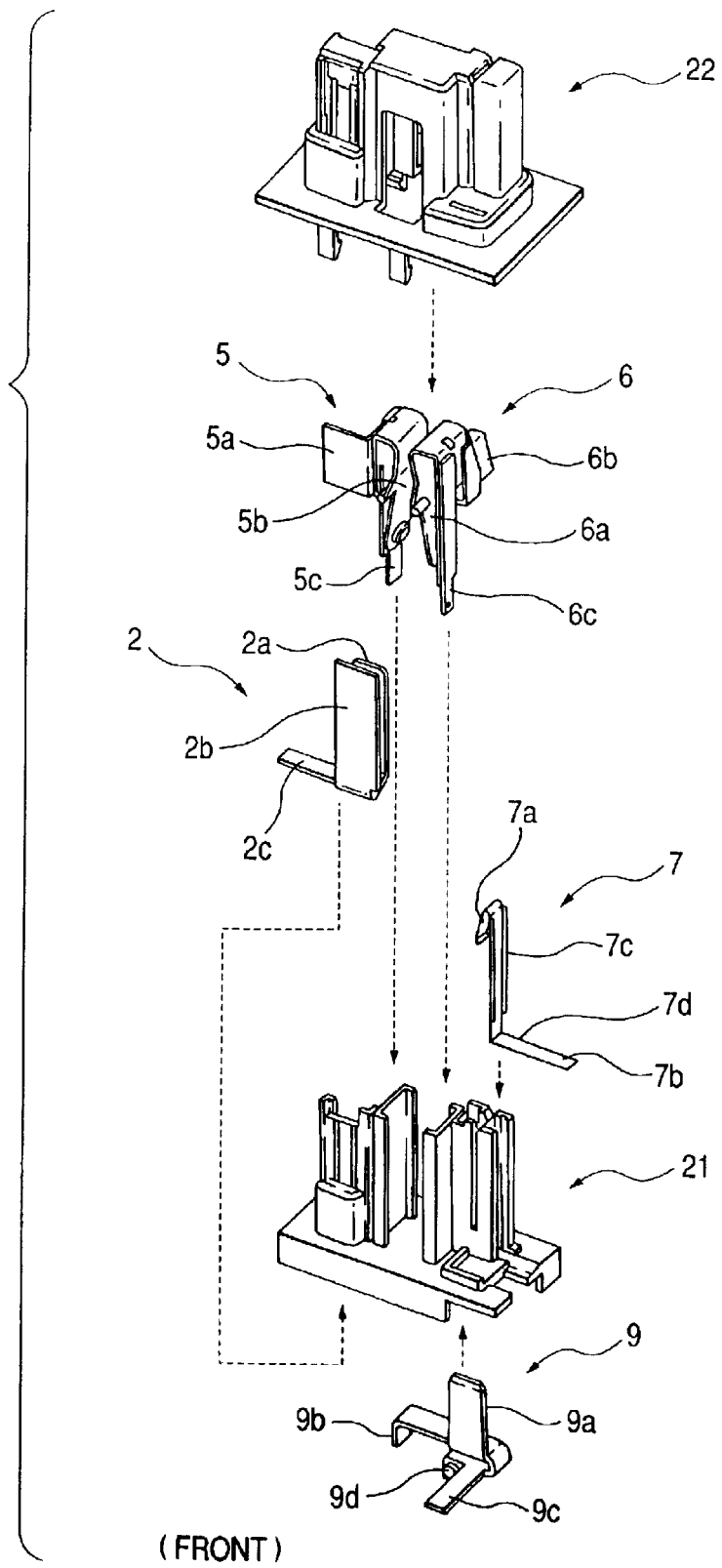
FIG. 3 is an exploded perspective view showing a fixed member comprising the protecting device according to the embodiment of the invention.

FIG. 2 is an exploded perspective view showing the movable member 12, and FIG. 3 is an exploded perspective view showing the fixed member 11. Also, the sides that are marked as "front" in FIGS. 2 to 14 are referred to as the front side in the following descriptions of each drawing.

The movable member 12 is provided with a plug housing 23, the connecting conductor 3 and conductive material 4 attached to the upper part of the plug housing 23, the movable side connecting terminals 1 and 8 attached to the lower part of the plug housing 23, a plug housing cover 24 placed over the plug housing 23 with the above components attached, and a lever 25 attached to opposing outer walls of the plug housing cover 24 in such a manner that the lever 25 can swing. The plug housing 23, plug housing cover 24 and the lever 25 are made of an insulating material such as an insulating resin.

Meanwhile the fixed member 11 is provided with a housing 21 made of an insulating material such as an insulating resin, an output terminal 9 attached to the lower part of the housing 21, terminal members 5 and 6, the input terminal 2 and terminal member 7 attached to the upper part of the housing 21, and the housing cover 22 placed over the housing 21 with the terminal member 5 etc., attached as above.

Figure 6:
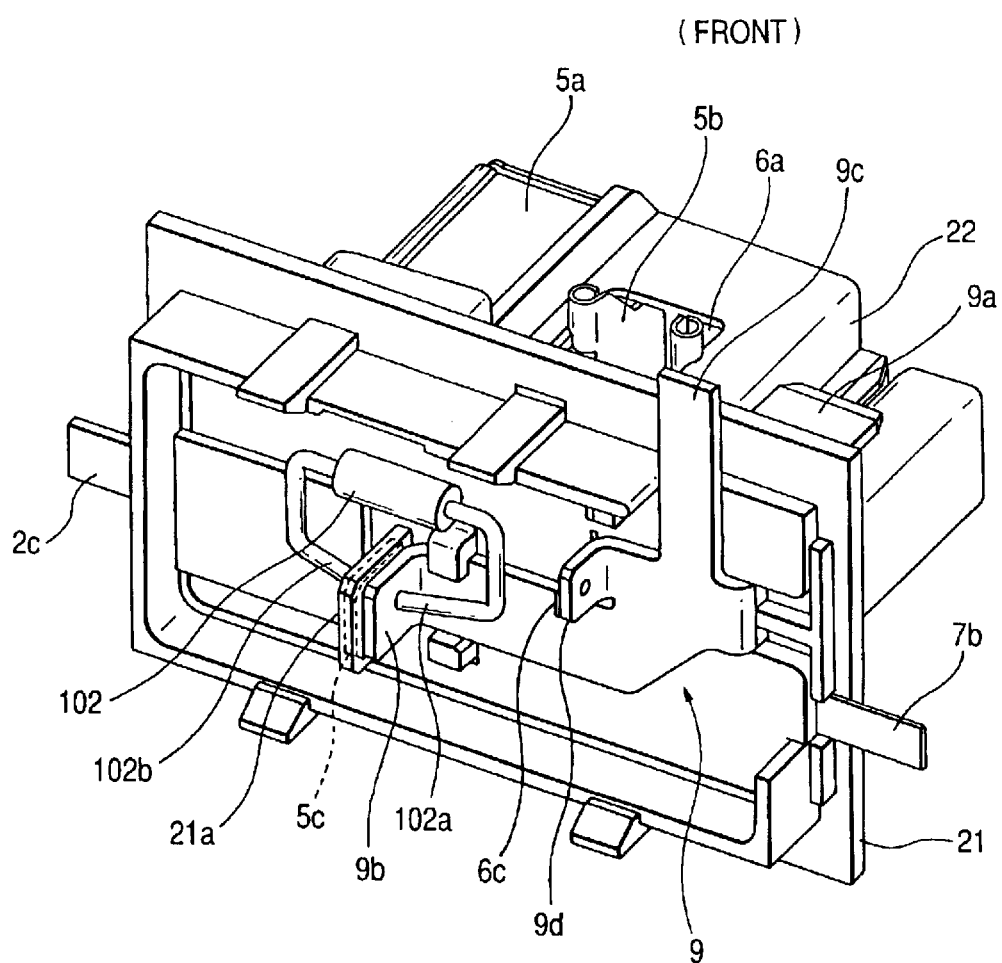
FIG. 6 is a perspective view of the fixed member taken from a lower point on the obliquely front side.

FIG. 4 is an exploded perspective view of the fixed member 11 taken from the front side, FIG. 5 is an exploded perspective view of the fixed member 11 of FIG. 4 taken from the opposite rear side, and FIG. 6 is a perspective view of the fixed member 11 taken from a lower point on the front side.

The output terminal 9 is attached to the lower part of the housing 21 closer to the front edge on the right. As shown in FIGS. 3 and 6, the output terminal 9 is provided with the terminal 9a extending upward, terminal 9b extending toward the left, terminal 9c extending toward the front and terminal 9d extending downward. The terminal 9c is disposed so as to contact the right hand side of a tongue-like piece 21a formed at the lower part of the housing 21 (refer to FIG. 6). Also, the terminal 9b is connected with an end 102a of a condenser 102.

As shown in FIGS. 3 and 4, on the opposite side of the output terminal 9, the terminal member 7 is attached to the upper part of the housing 21. The terminal member 7 is generally formed in L-shape, and the terminal 7a that is bent downward is provided at the top of its perpendicular portion 7c, and the terminal 7b is provided at the end of its horizontal portion 7d.

On the left of the terminal member 7, the terminal member 6 is attached to the upper part of the housing 21, as shown in FIGS. 3 to 5. The terminal member 6 is provided with the terminal 6b confronting the terminal 7a, the terminal (spring piece) 6a disposed opposite to the terminal 7a across the terminal 6b, and the terminal 6c (refer to FIG. 6) penetrating through the housing 21 from its upper to lower part. The terminal 6c is contacting with the terminal 9d in the lower part of the housing 21. Also, the terminal protecting contact 31 is attached at the lower end of the terminal 6a and on the opposite side of the terminal member 7, and the roll sections 29a and 29b projecting widthwise toward both sides are provided halfway along the vertical direction of the terminal 6a.

On the left of the terminal member 6, the terminal member 5 is attached to the upper part of the housing 21. The terminal member 5 is provided with the terminal (spring piece) 5b confronting the terminal 6a, the terminal 5c (refer to FIG. 6) penetrating through the housing 21 from its upper to lower part, and the current switching terminal 5a that makes a right angle with the terminal 5c. The terminal 5c is disposed at the left of the tongue-like piece 21a formed at the lower part of the housing 21 and is insulated from the terminal 9b, and is connected with the other end 102b of the condenser 102 (refer to FIG. 6). Also, on the front surface of the terminal 5b confronting the terminal 6a, the terminal protecting contact 30 is attached at a point that meets with the terminal protecting contact 31, and the roll sections 28a and 28b projecting widthwise toward both sides are provided halfway along the vertical direction of the terminal 5b.

On the left of the terminal member 5, the input terminal 2 is attached to the upper part of the housing 21. The input terminal 2 is provided with the current switching terminal 2b extending upward to confront the current switching terminal 5a, the terminal 2a extending upward as well, and the terminal 2c extending toward the left, as shown in FIGS. 3 and 5.

Figure 7:
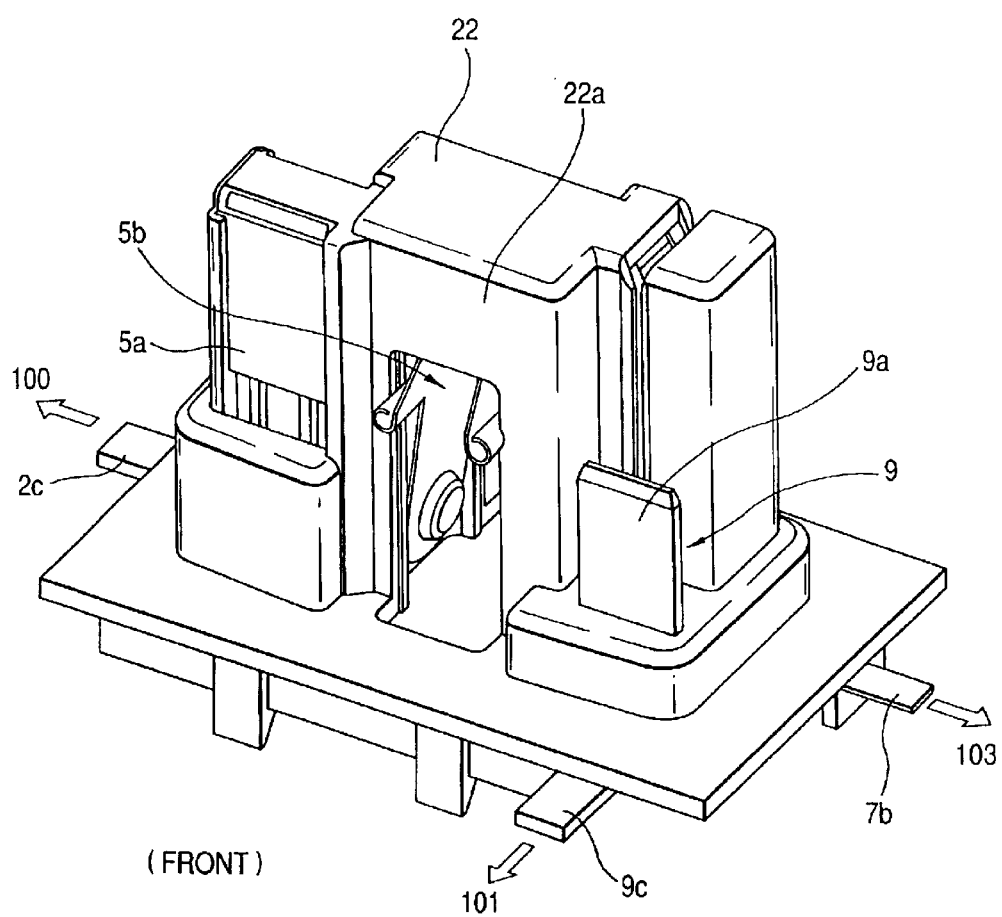
FIG. 7 is a perspective view showing a state where a housing cover is attached to a housing in which each terminal member comprising the fixed member is attached, taken from the obliquely front side.
Figure 8:
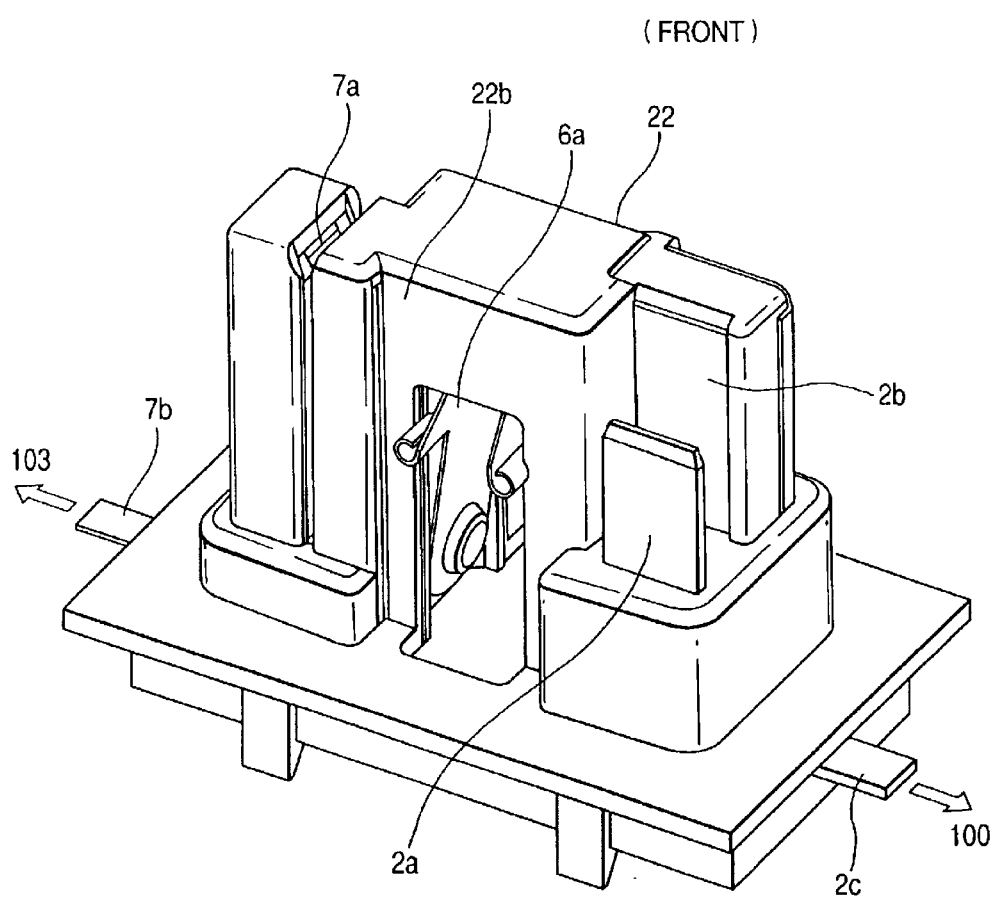
FIG. 8 is a perspective view showing the state of FIG. 7 taken from the obliquely rear side.

FIG. 7 is a perspective view taken from the front side showing a state where the housing cover 22 is attached over the housing 21 to which the input terminal 2, terminal member 5, terminal member 6, terminal member 7 and output terminal 9 are attached, and FIG. 8 is a perspective view showing the same state taken from the rear side.

Under a state where the housing cover 22 is attached, the roll sections 28a and 29a are protruding outward from the front wall 22a of the housing cover 22, and the roll sections 28b and 29b are protruding outward from the rear wall 22b of the housing cover 22. Also, the terminals 2a, 2b, 2c, 5a, 7b, 9a and 9b are exposed outside, among which the terminals 5a and 2b are opposed across the housing 21. Further, the terminal 2c exposed outside is connected with the battery 100, the terminal 7b also exposed is connected with the discharge resistance 103, and the terminal 9c exposed as well is connected with the electric load 101, respectively.

Figure 9:
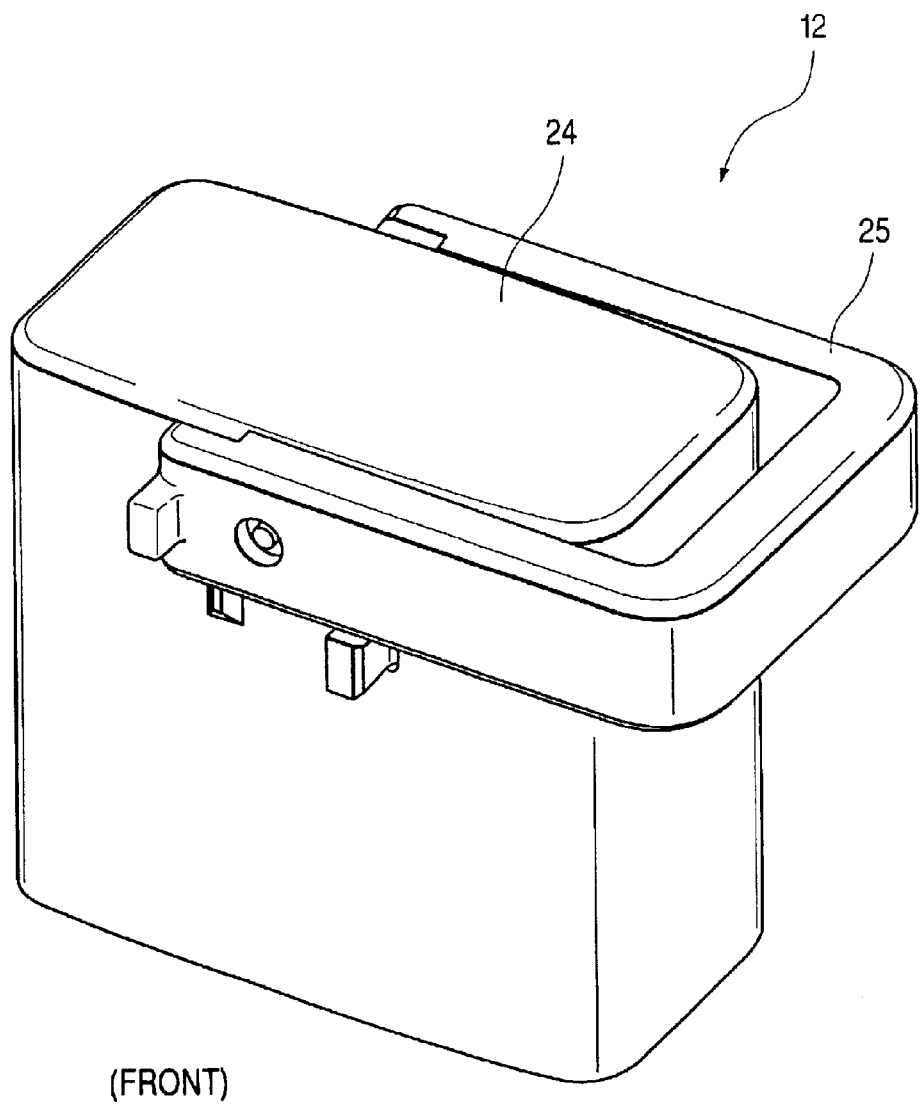
FIG. 9 is a perspective view of the appearance of the movable member taken from an upper point on the obliquely front side.
Figure 10:
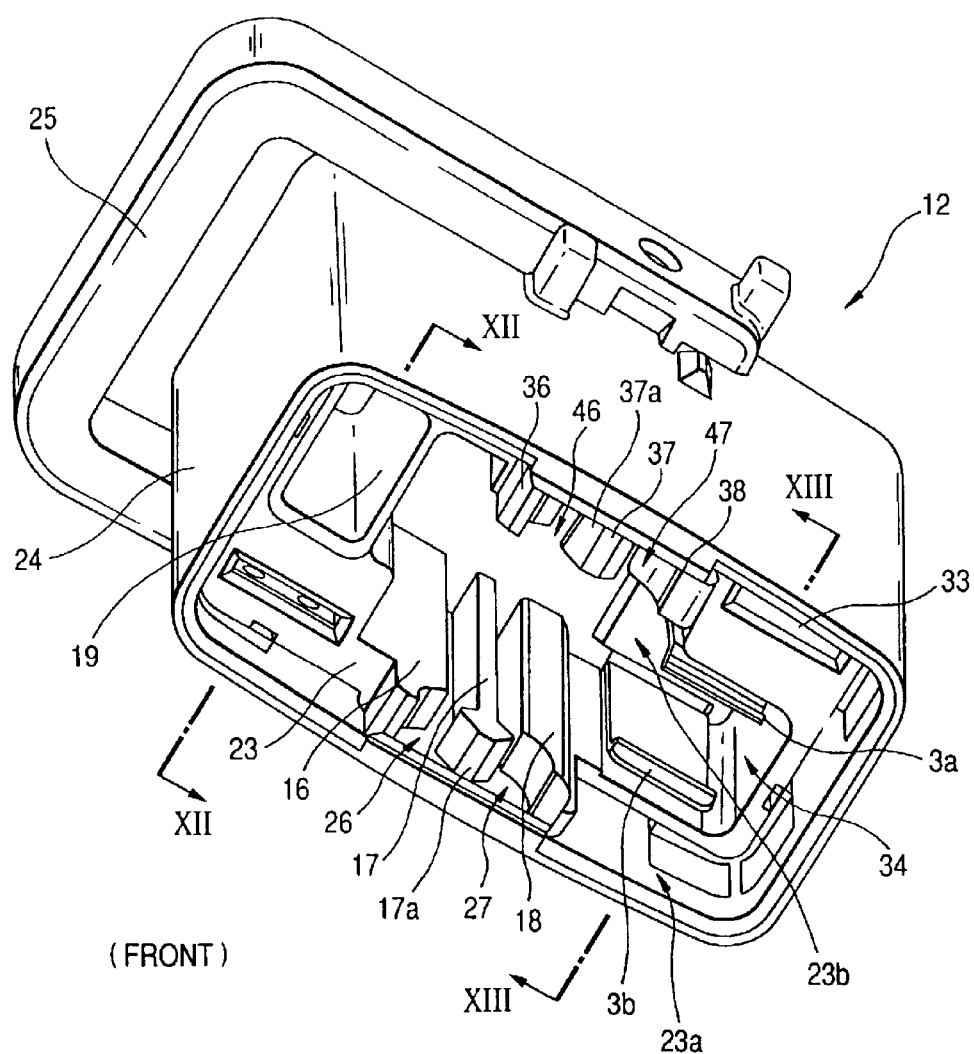
FIG. 10 is a perspective view of the appearance of the movable member taken from a lower point on the obliquely front side.

FIG. 9 is a perspective view of the appearance of the movable member 12 taken from an upper point on the front side, and FIG. 10 is a perspective view of the appearance of the movable member 12 taken from a lower point on the front side.

Figure 11:
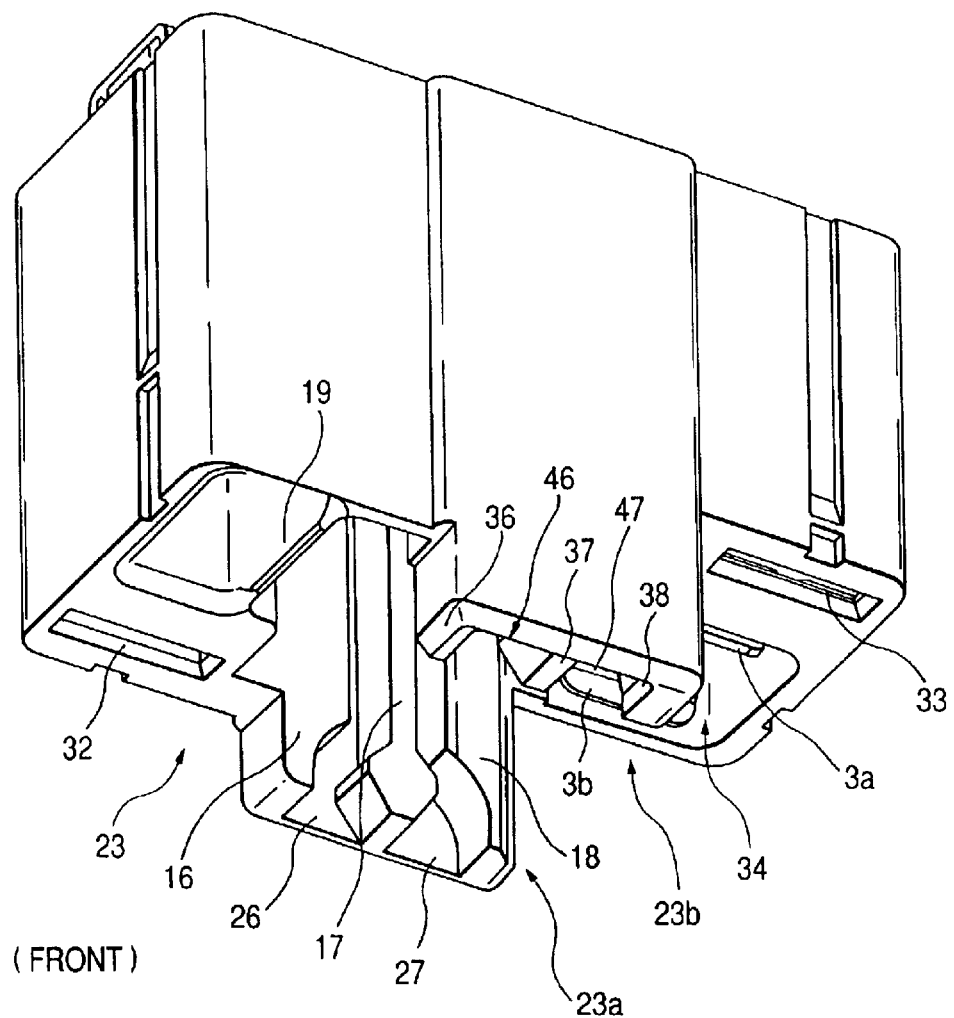
FIG. 11 is a perspective view showing a plug housing taken from a lower point on the obliquely rear side.

Outside of the plug housing cover 24, the lever 25 is rotatably attached. Meanwhile, inside of the plug housing cover 24 the plug housing 23 of FIG. 11 is stored.

The plug housing 23 is provided with the descending pieces 16, 17 and 18 inside of its front wall 23a for constructing the operating section 48, and the clearance between the descending pieces 16 and 17 works as guide groove 26, and the clearance between the descending pieces 17 and 18 as guide groove 27. The plug housing 23 also comprises the descending pieces 36, 37 and 38 inside of its rear wall 23b for constructing the operating section 48, and the clearance between the descending pieces 36 and 37 works as guide groove 46, and the clearance between the descending pieces 37 and 38 as guide groove 47. On the right of the descending piece 16 (on the left in FIG. 10), the descending wall 19 is formed with its thickness wise direction aligned with the descending pieces 16 to 18, for insulating the terminal 6b from 7a.

Also, an opening 32 is provided ahead of the descending wall 19 for inserting the terminal 9a, and an opening 33 is provided on the left (on the right in FIG. 10) of the descending piece 18 for inserting the input terminal 2, and ahead of the opening 33 the terminals 3a and 3b of the connecting conductor 3 of the reverse U-shape attached to the upper part of the plug housing 23 are exposed in the inner hollow 34 (refer to FIG. 13 to be later described).

Figure 12:
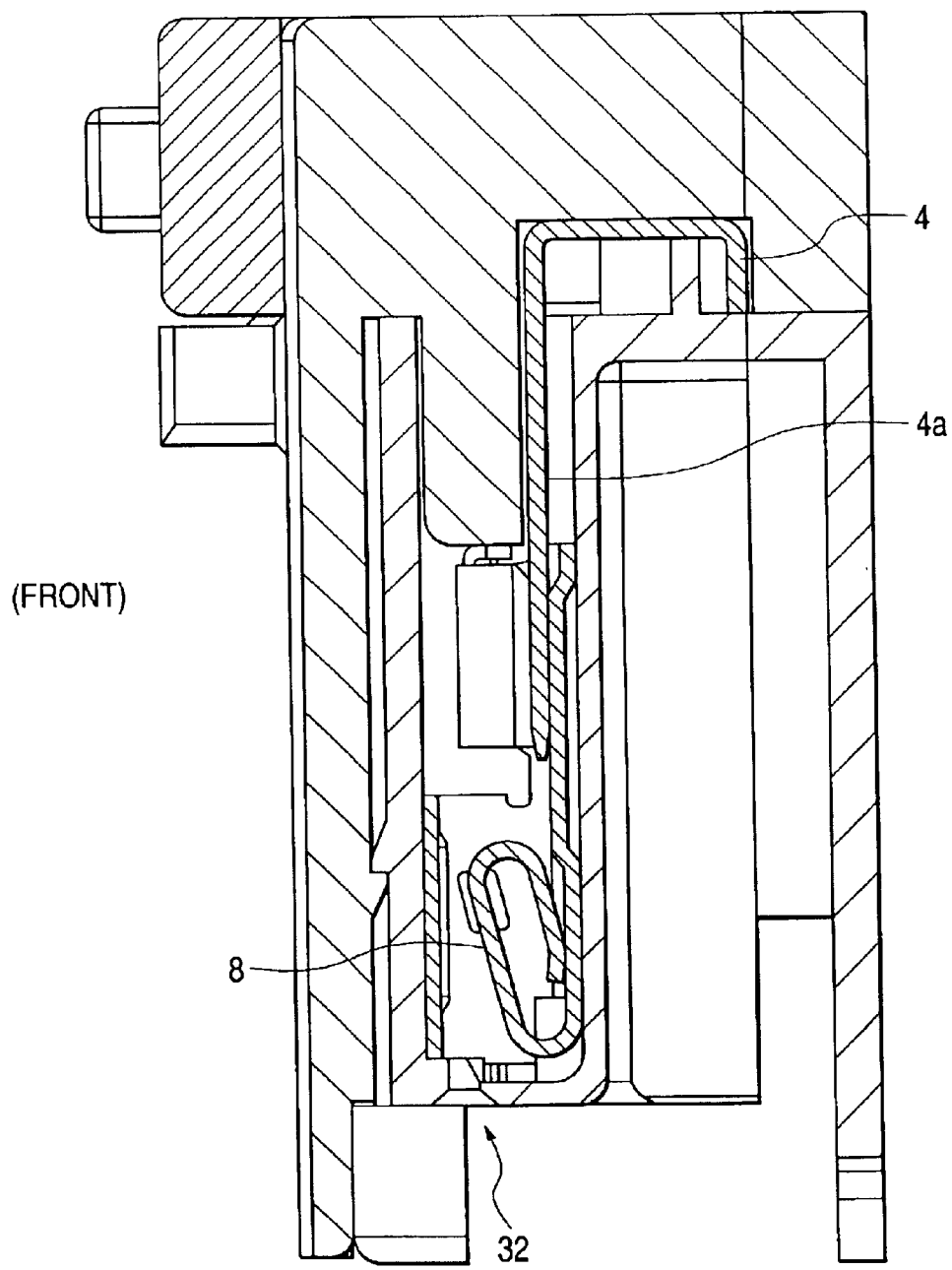
FIG. 12 is a cross-sectional view taken along the line XII—XII of FIG. 10.
Figure 13:
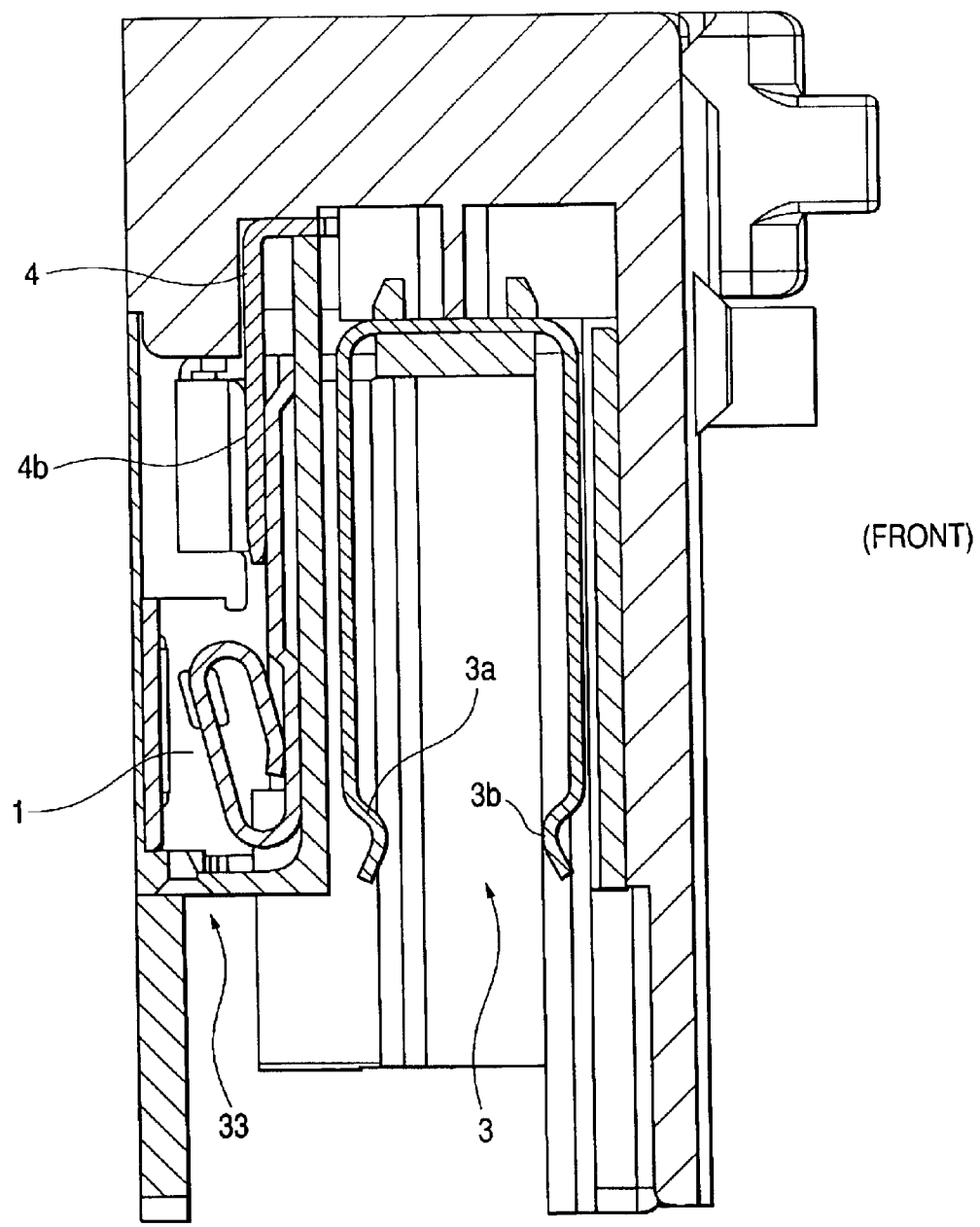
FIG. 13 is a cross-sectional view taken along the line XIII—XIII of FIG. 10.

FIG. 12 is a cross-sectional view taken along the line XII—XII of FIG. 10, and FIG. 13 is a cross-sectional view taken along the line XIII—XIII of FIG. 10.

Referring to FIG. 12, the movable side connecting terminal 8 is disposed above the opening 32, and the conductive material 4 is connected with the movable side connecting terminal 8. Meanwhile, as shown in FIG. 13 the movable side connecting terminal 1 is disposed above the opening 33, and the conductive material 4 is connected with the movable side connecting terminal 1.

Figure 14:
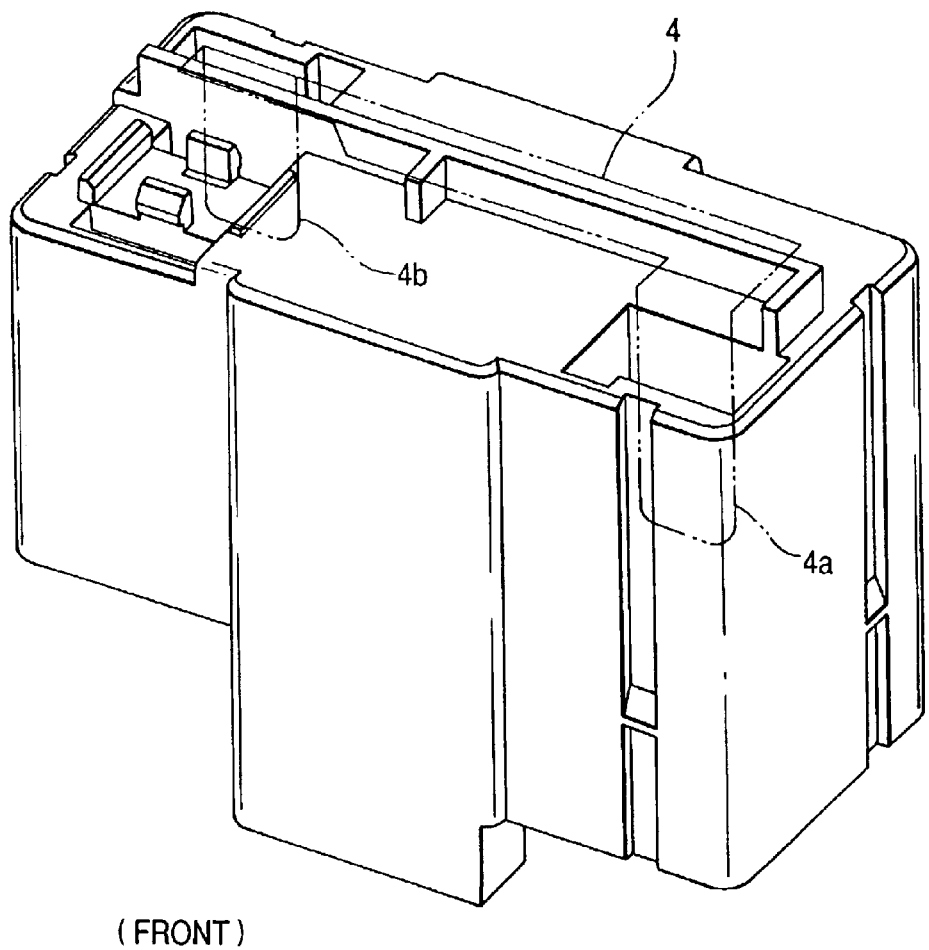
FIG. 14 is a perspective view of the plug housing taken from an upper point on the obliquely front side.

Referring to FIG. 14, the conductive material 4 is provided along the upper part of the plug housing 23 as shown by the chain line, and comprises a longer terminal 4a at its right end and a shorter terminal 4b at its left end, both extending downward respectively. The longer terminal 4a is connected with the movable side connecting terminal 8 as shown in FIG. 12, while the shorter terminal 4b is connected with the movable side connecting terminal 1 as shown in FIG. 13.

Figure 15:
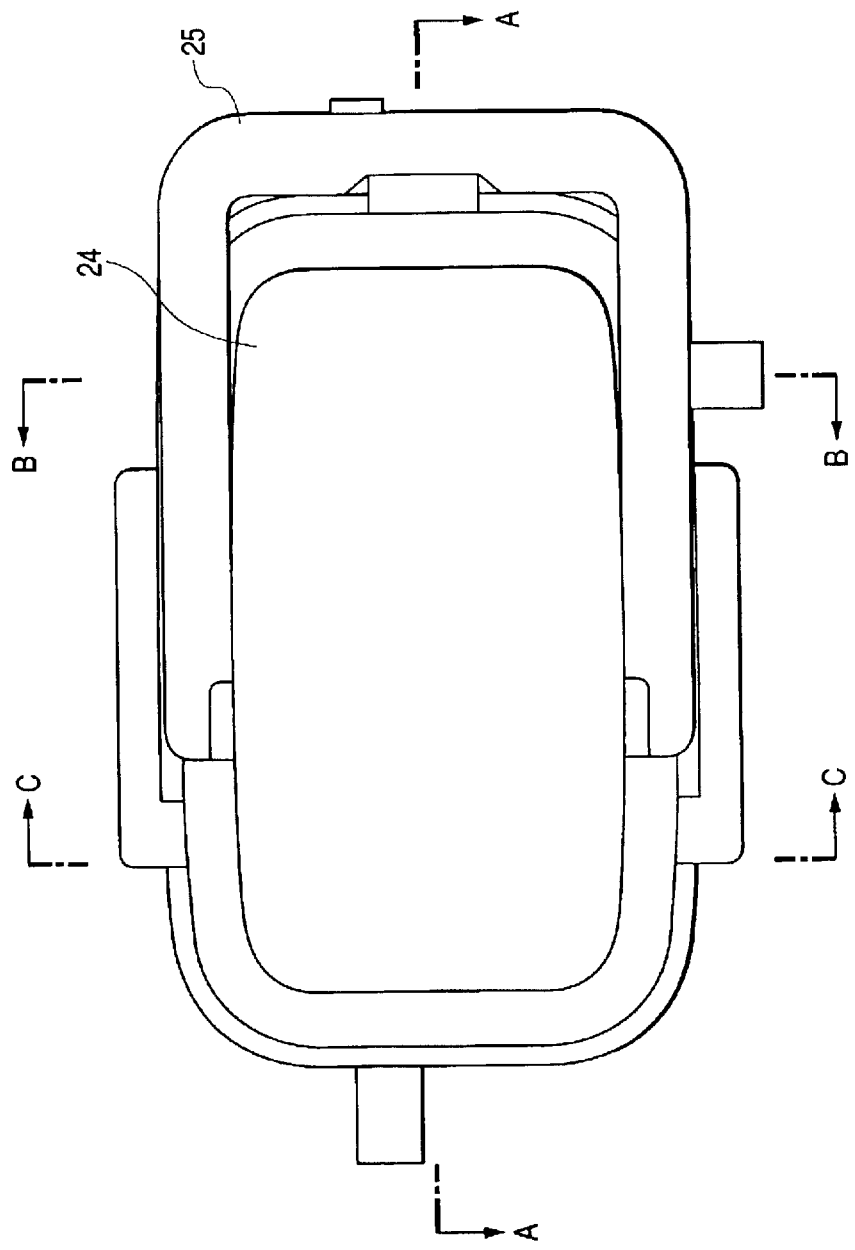
FIG. 15 is a plan view showing a state where the movable member is attached over the fixed member.
Figure 16:
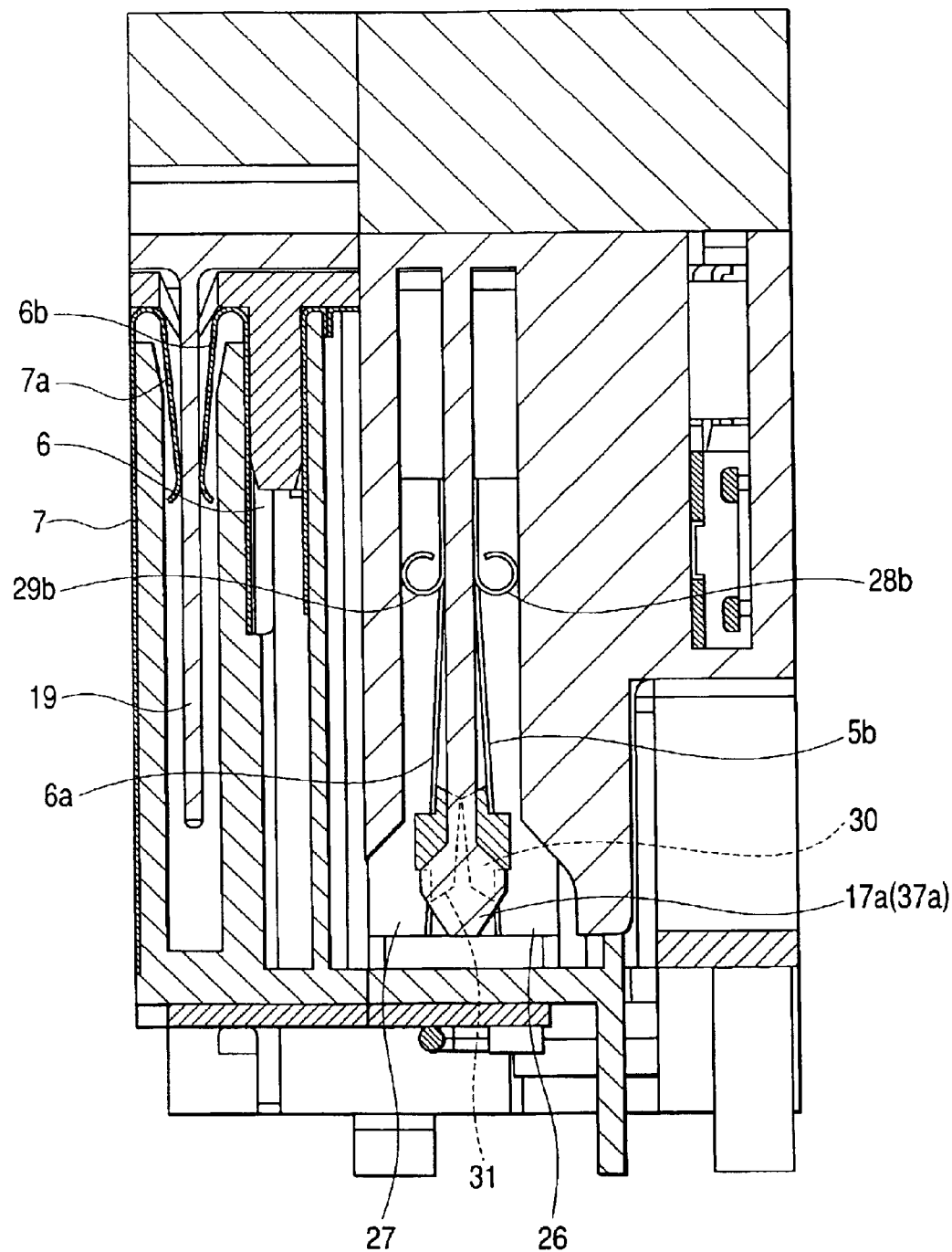
FIG. 16 is a cross-sectional view taken along the line A—A of FIG. 15.
Figure 17:
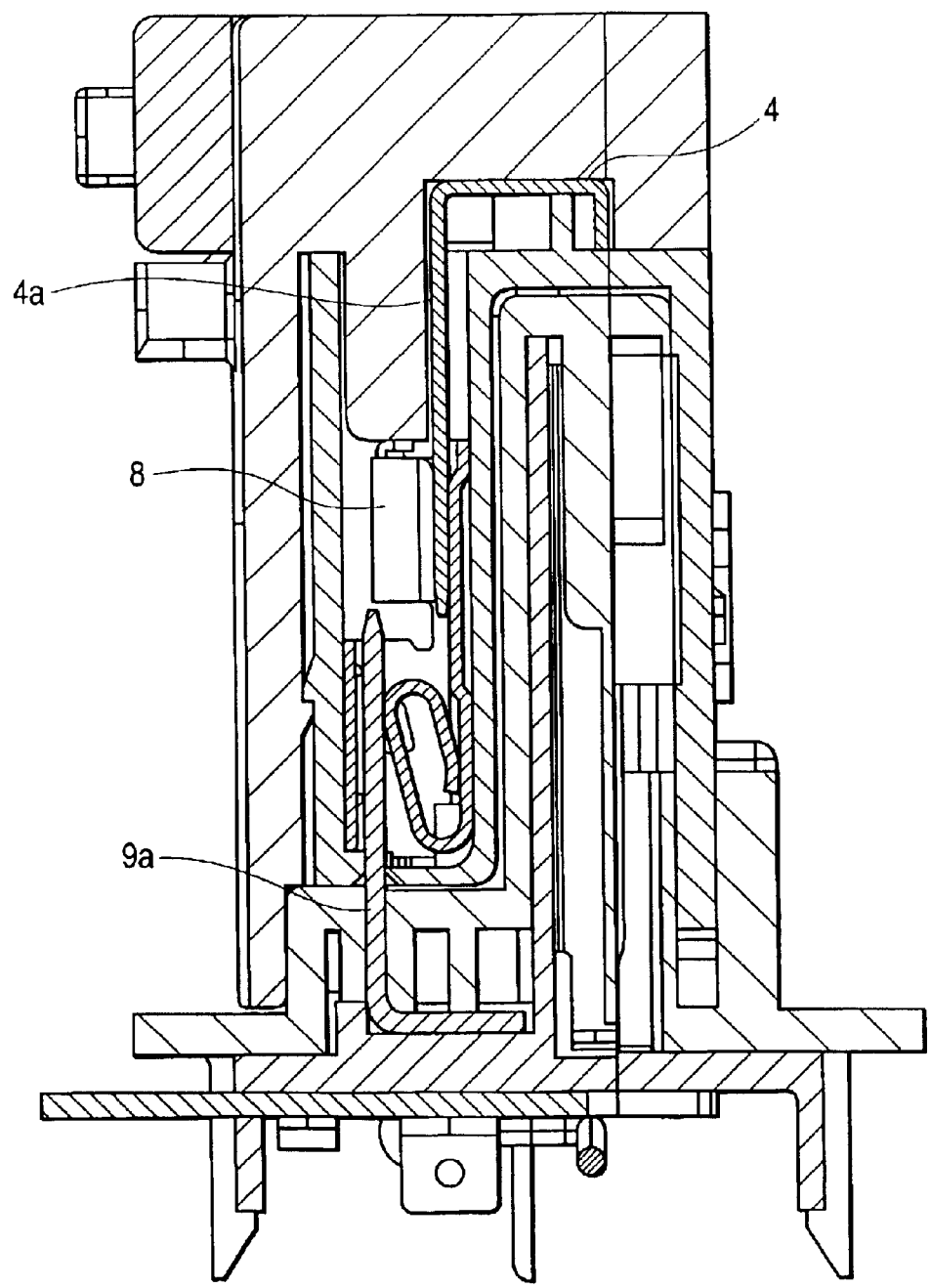
FIG. 17 is a cross-sectional view taken along the line B—B of FIG. 15.
Figure 18:
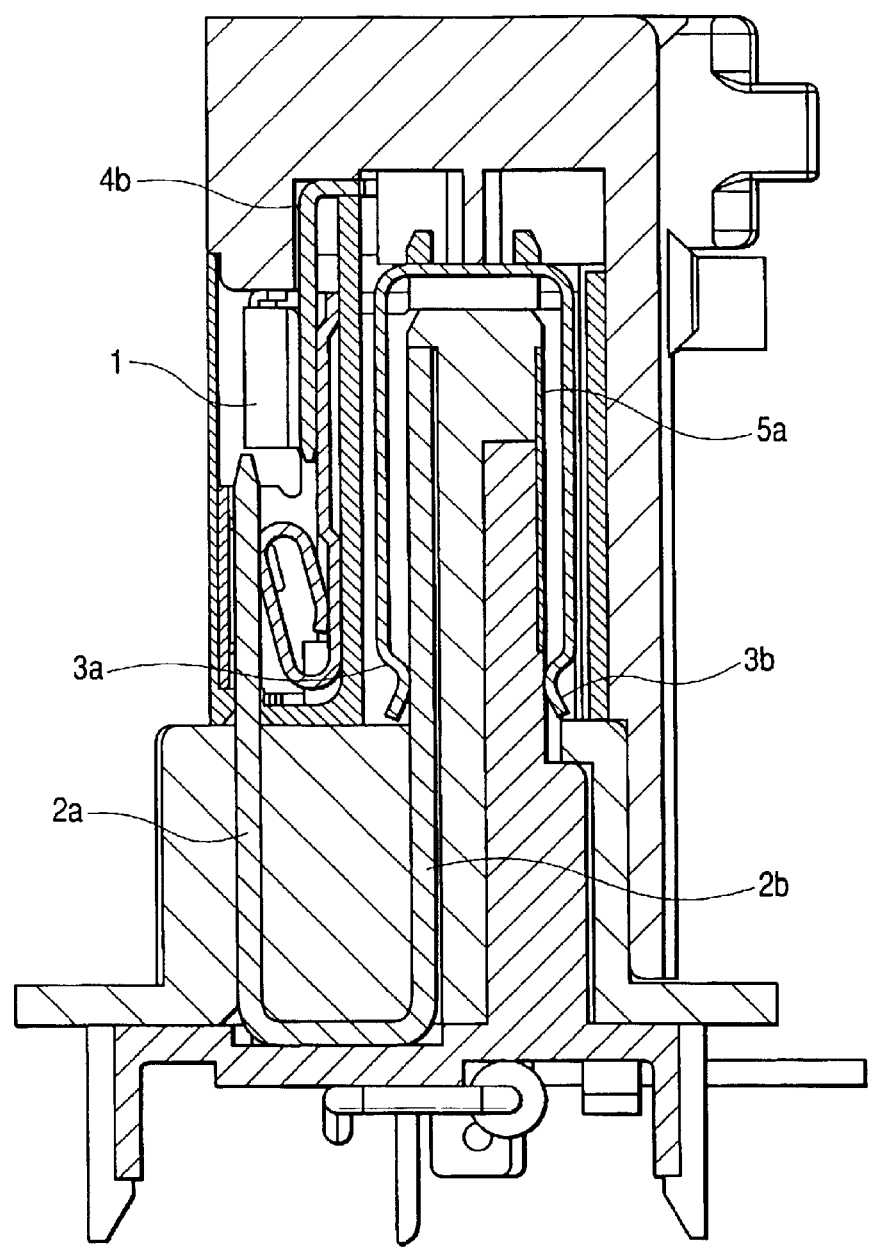
FIG. 18 is a cross-sectional view taken along the line C—C of FIG. 15.

FIG. 15 is a plan view showing a state where the movable member 12 is attached over the fixed member 11, FIG. 16 is a cross-sectional view taken along the line A—A of FIG. 15, FIG. 17 is a cross-sectional view taken along the line B—B of FIG. 15, and FIG. 18 is a cross-sectional view taken along the line C—C of FIG. 15.

Under this attached state, the terminals 7b and 7a are insulated by the descending wall 19 while the terminal protecting contacts 30 and 31 are contacting with each other as shown in FIG. 16; the terminal 4a is connected with the movable side connecting terminal 8, with which the terminal 9a is connected as shown in FIG. 17; the terminal 4b is connected with the movable side connecting terminal 1, with which the terminal 2a of the input terminal 2 connected with the battery 100 is connected as shown in FIG. 18; the terminal 3a of the connecting conductor 3 and the current switching terminal 2b of the input terminal 2 are connected; and the terminal 3b of the connecting conductor 3 and the current switching terminal 5a of the terminal member 5 are disconnected.

As a result, a voltage of the battery 100 is applied to the electric load 101 through the input terminal 2 connected with the movable side connecting terminal 1, which is connected with the conductive material 4 that is serving as the first current pass, which is connected with the movable side connecting terminal 8, which is connected with the output terminal 9 that is also connected with the electric load 101. Meanwhile, since the terminals 3b and 5a are separated the second current pass 15 is disconnected.

Figure 19A:
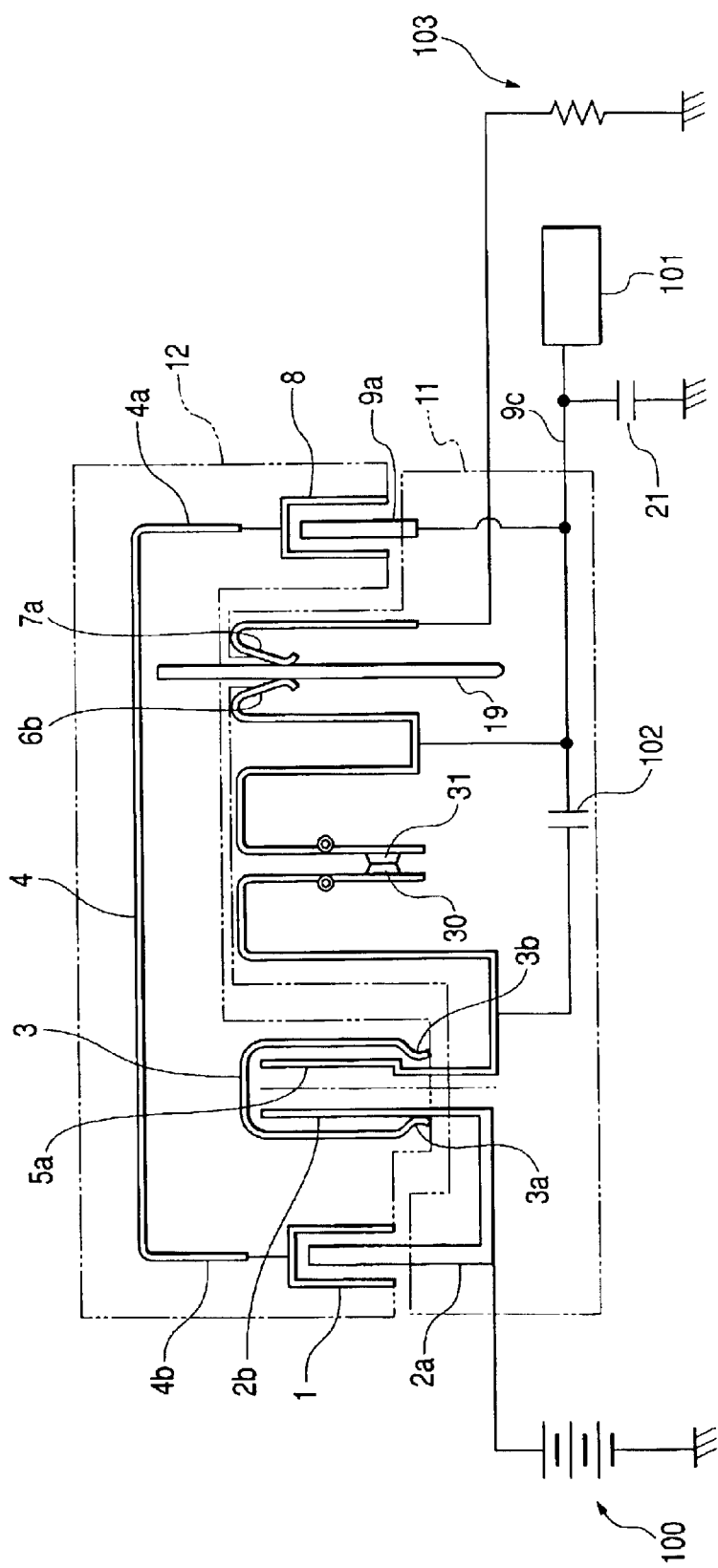
FIG. 19A is a schematic drawing showing the second process.
Figure 19B:
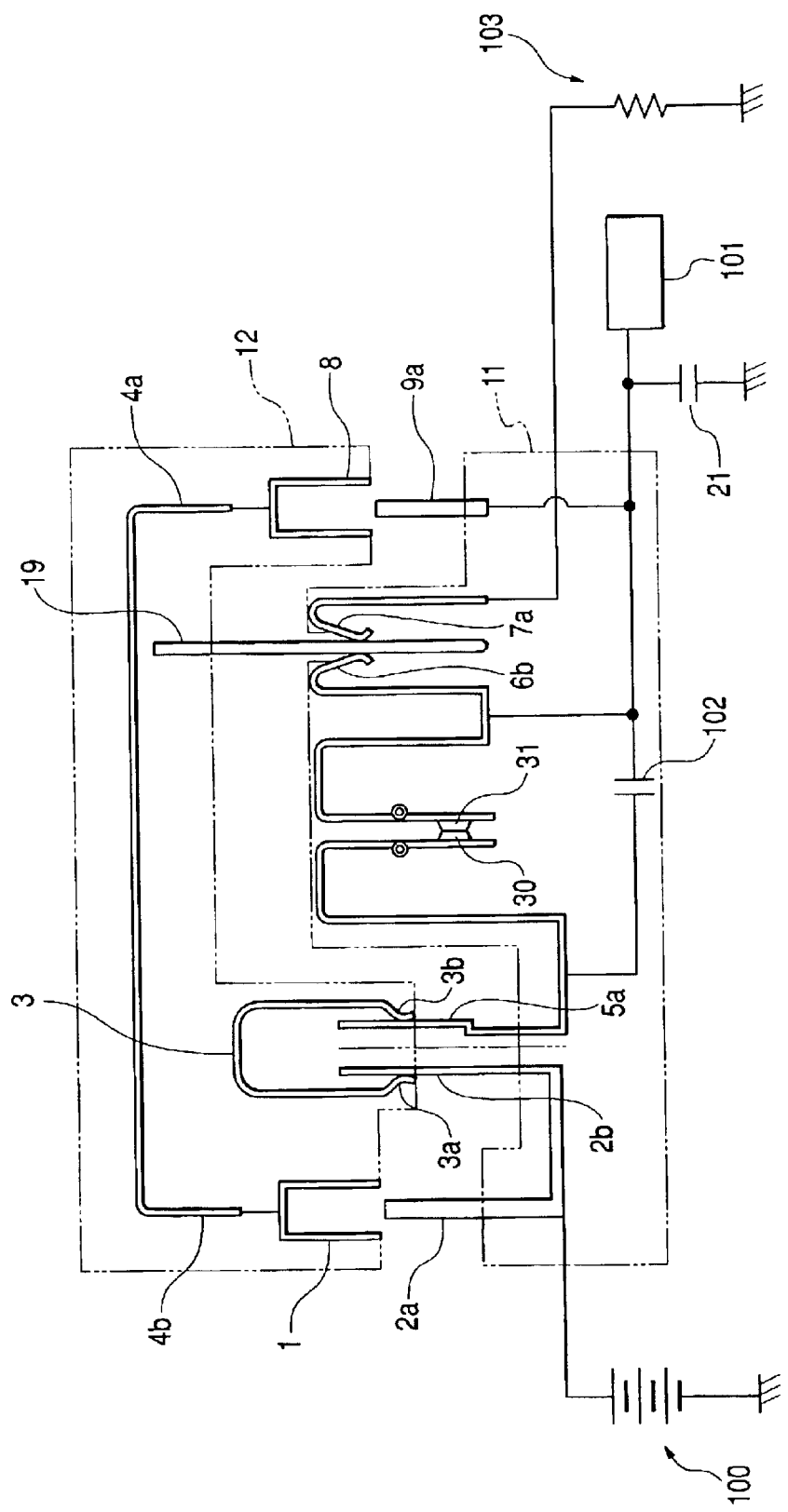
FIG. 19B is a schematic drawing showing the third process.
Figure 20A:
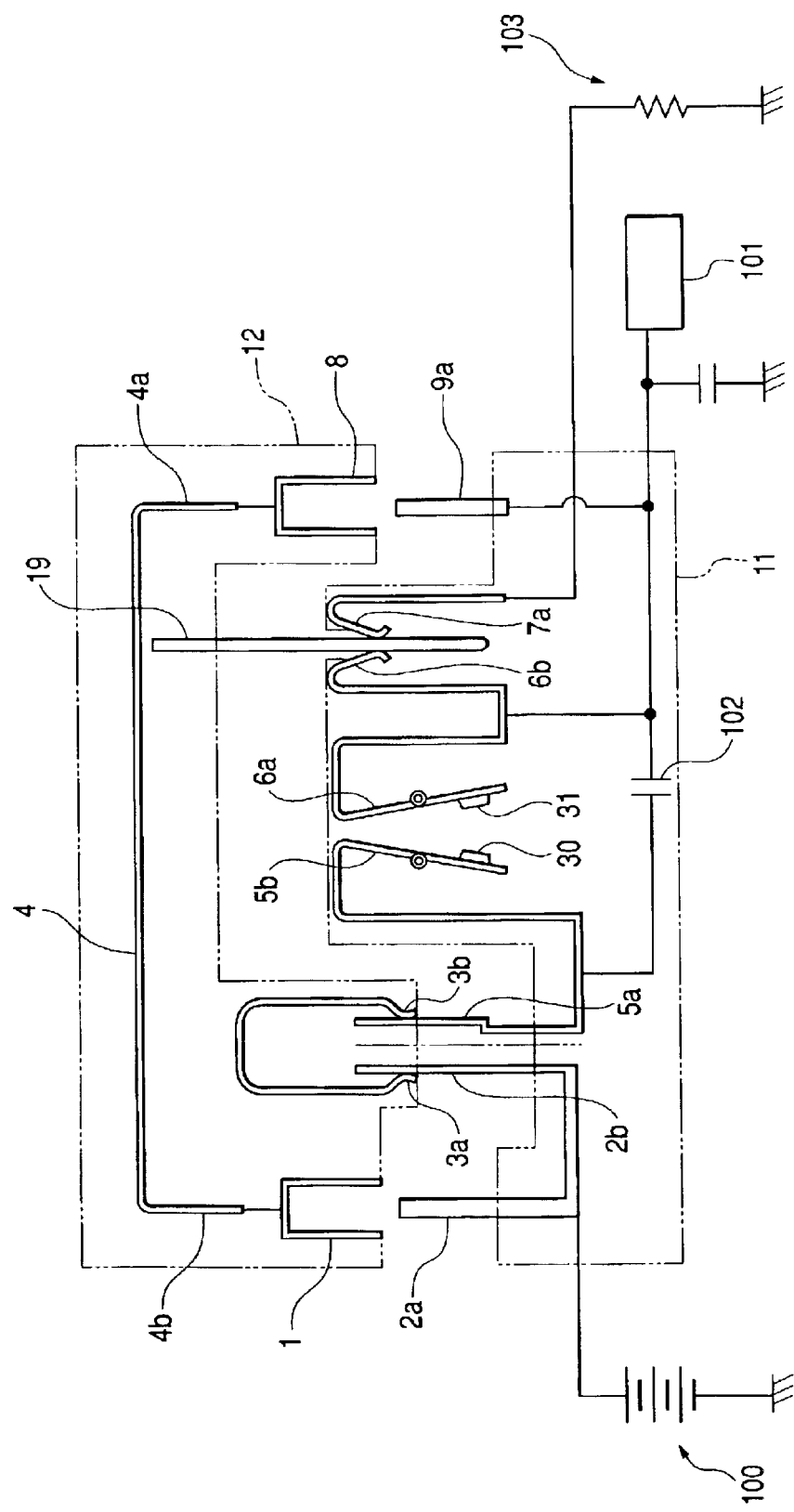
FIG. 20A is a schematic drawing showing the fourth process.
Figure 20B:
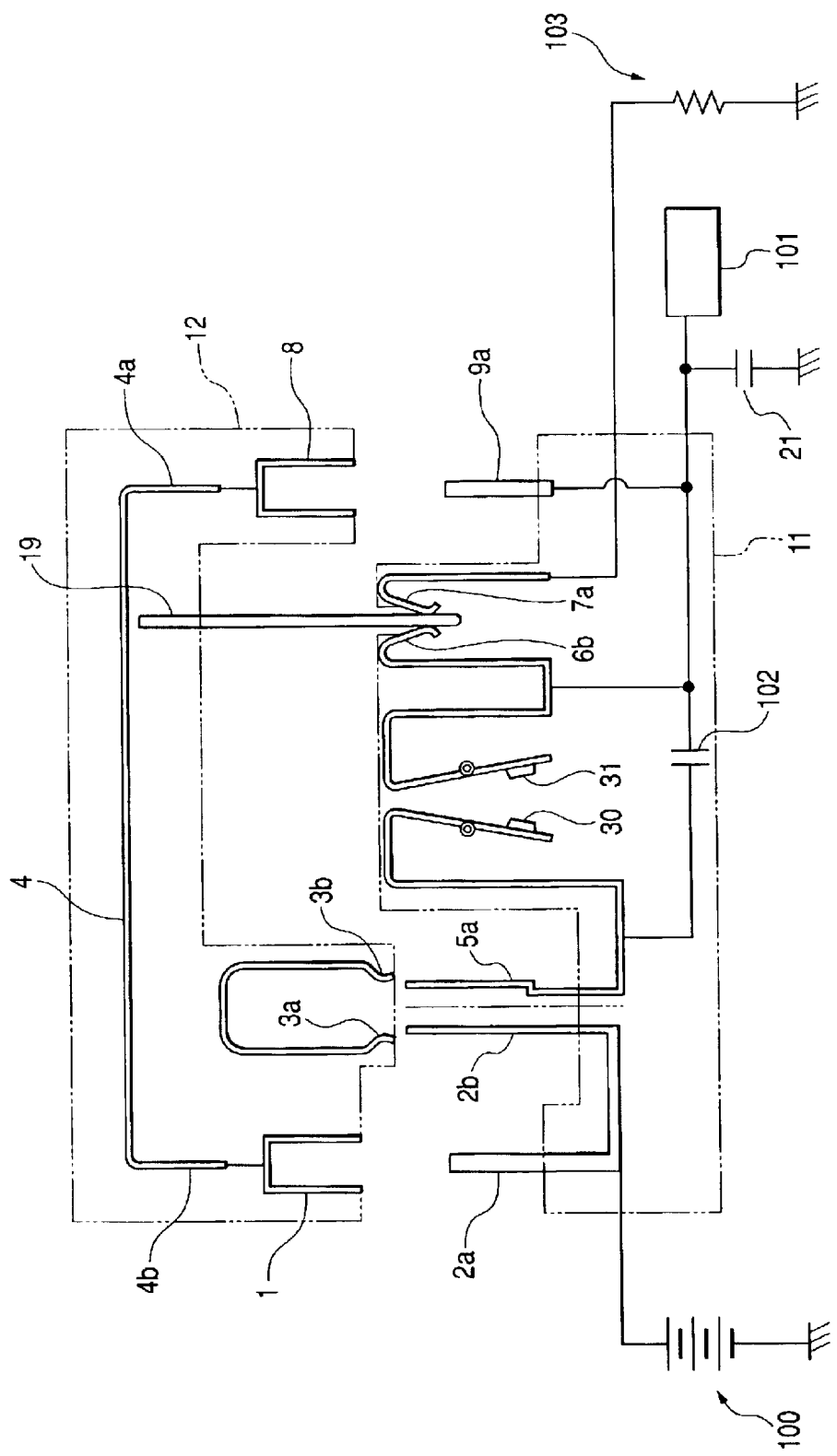
FIG. 20B is a schematic drawing showing the fifth process.

Now, electric operations for transition from a state where the battery 100 and the electric load 101 are connected through the first current pass (conductive material 4) as shown in FIG. 1B to a disconnected state as FIG. 1A by removing the movable member 12 from the fixed member 11, shall be described in the following six fractionized processes, i.e. the first process shown in FIG. 1A, second process shown in FIG. 19A, third process shown in FIG. 19B, fourth process shown in FIG. 20A, fifth process shown in FIG. 20B and the final sixth process shown in FIG. 1A. Here, since the first process is as shown in FIGS. 16 to 18, the description is omitted.

Figure 21:
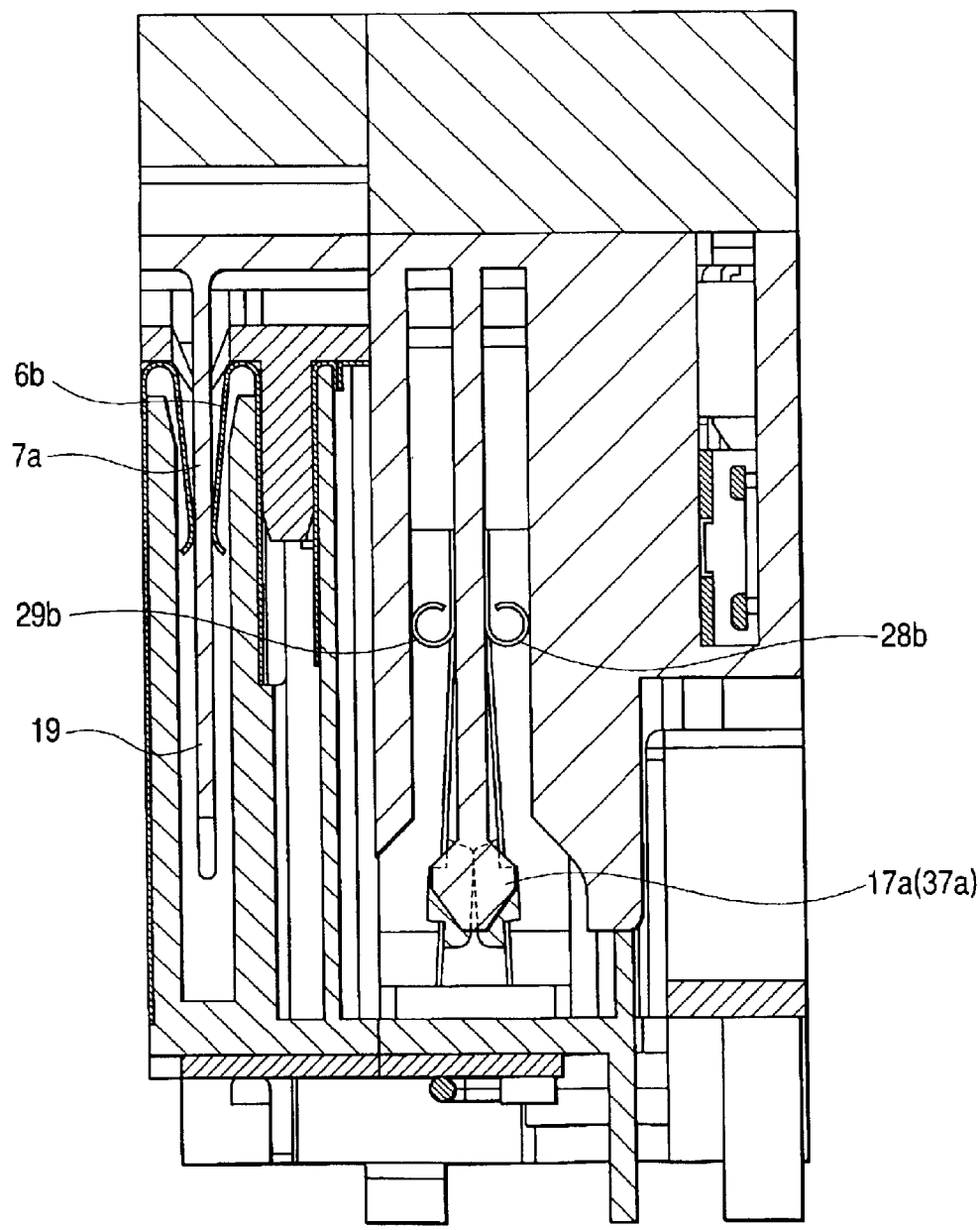
FIG. 21 is a drawing showing a state of the second process (a cross-sectional view taken along the line A—A of FIG. 15).
Figure 22:
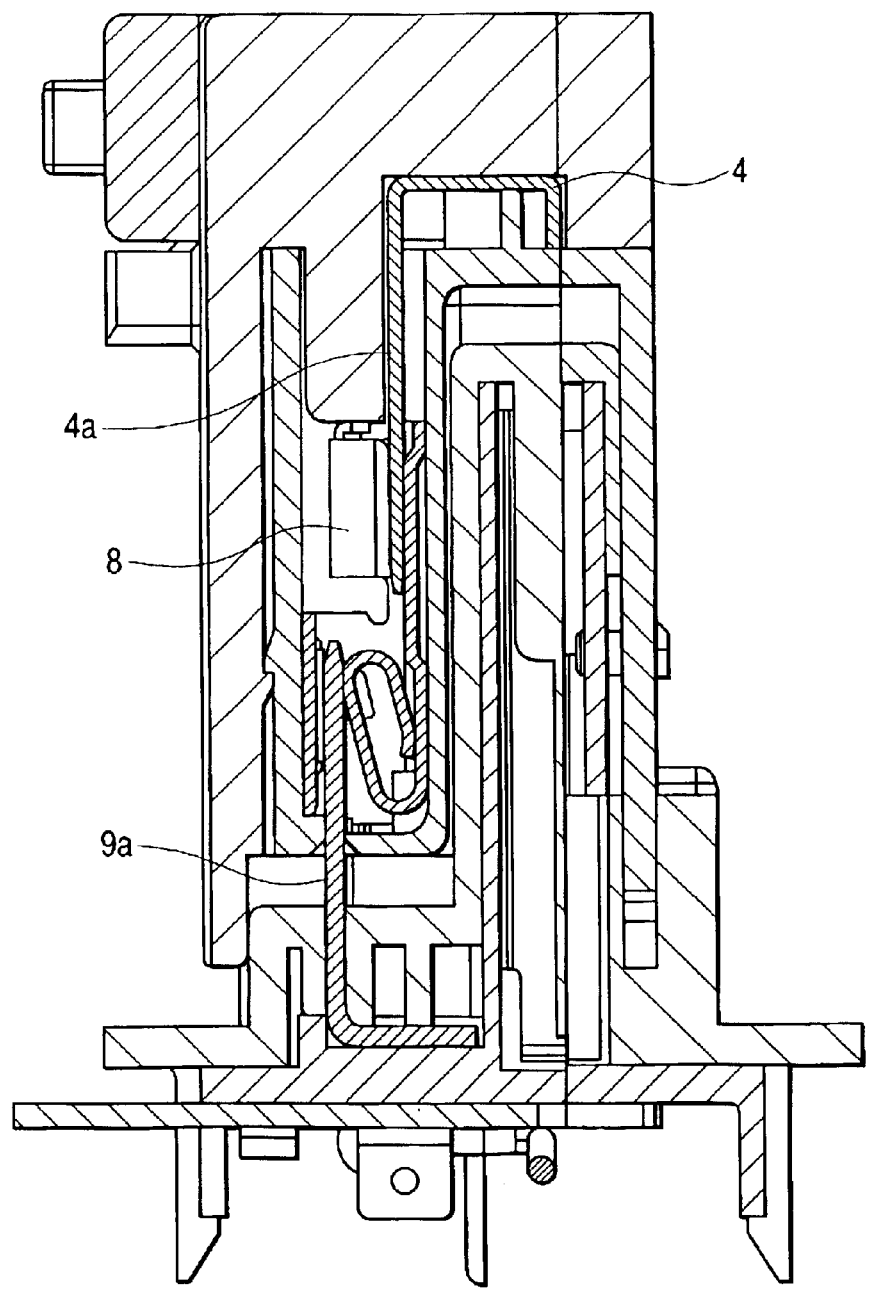
FIG. 22 is a drawing showing a state of the second process (a cross-sectional view taken along the line B—B of FIG. 15).
Figure 23:
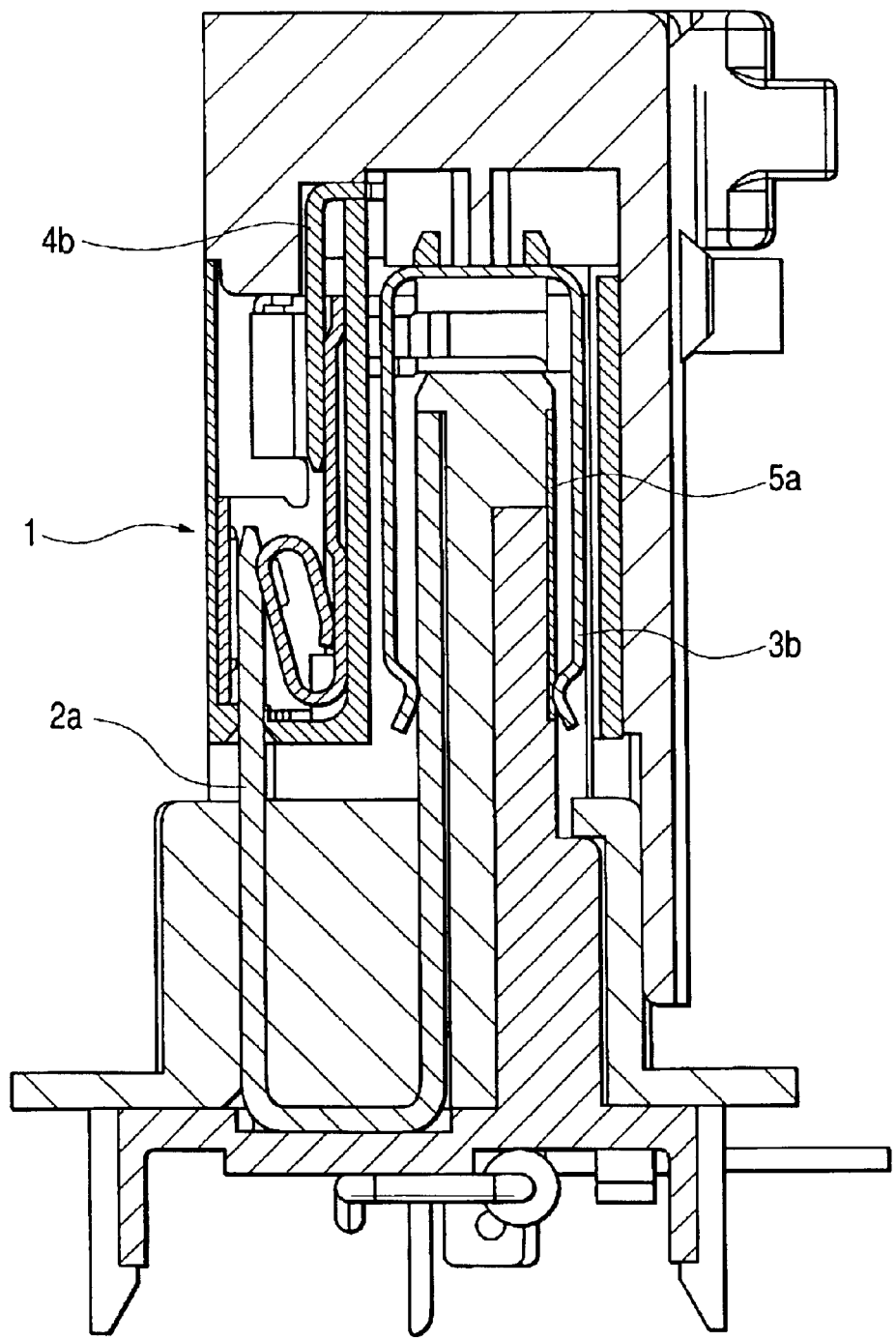
FIG. 23 is a drawing showing a state of the second process (a cross-sectional view taken along the line C—C of FIG. 15).
Figure 24:
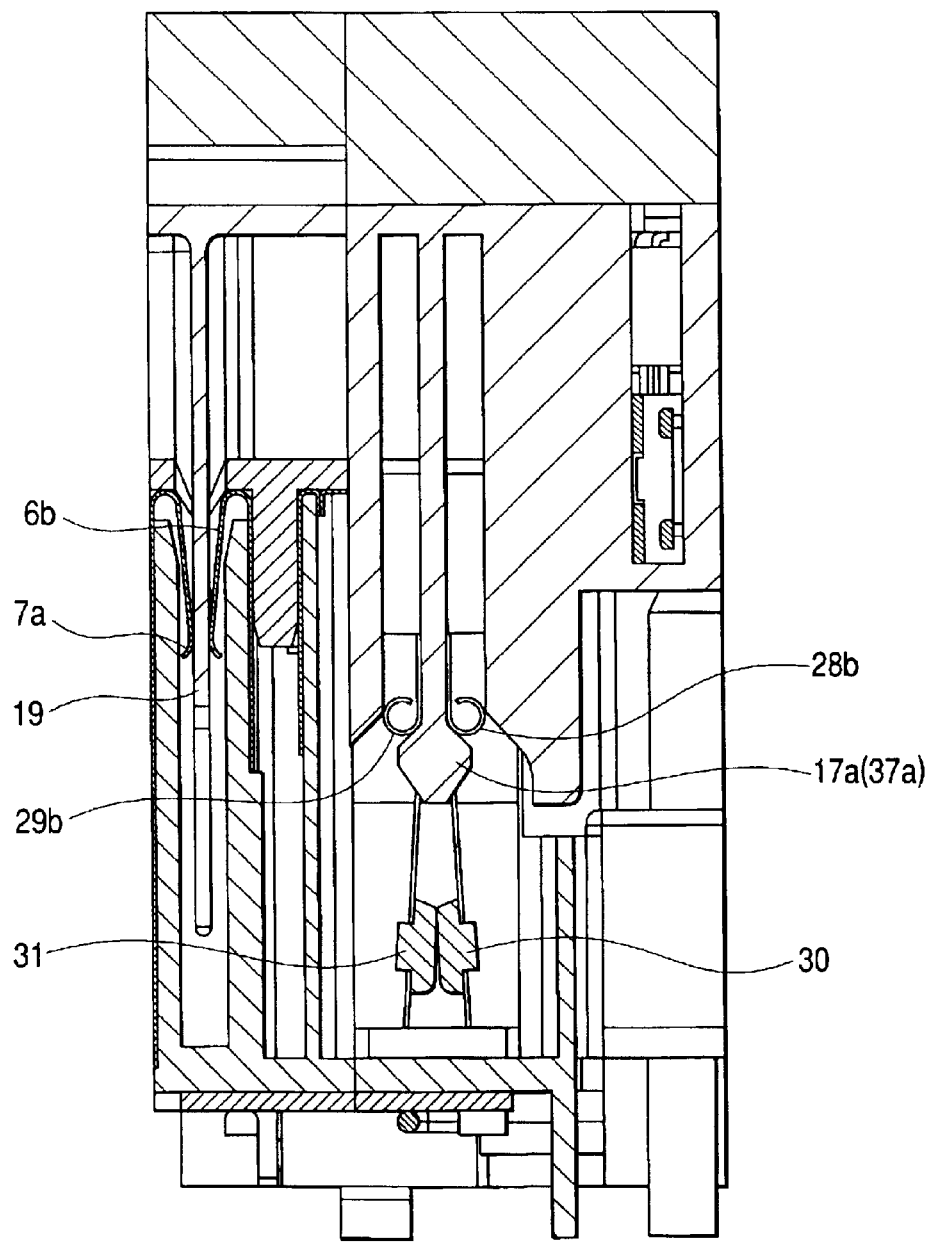
FIG. 24 is a drawing showing a state of the third process (a cross-sectional view taken along the line A—A of FIG. 15).
Figure 25:
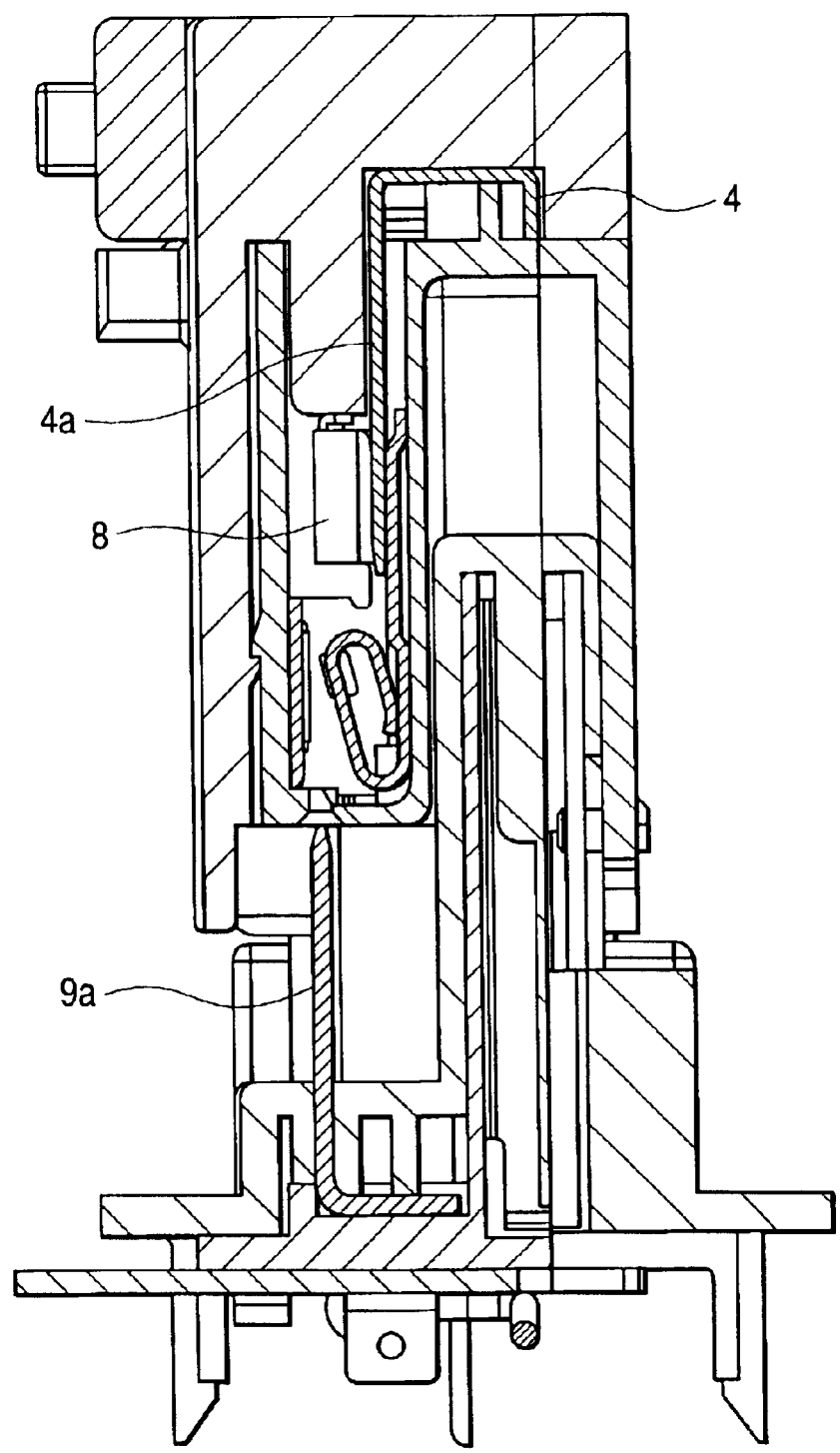
FIG. 25 is a drawing showing a state of the third process (a cross-sectional view taken along the line B—B of FIG. 15).
Figure 26:
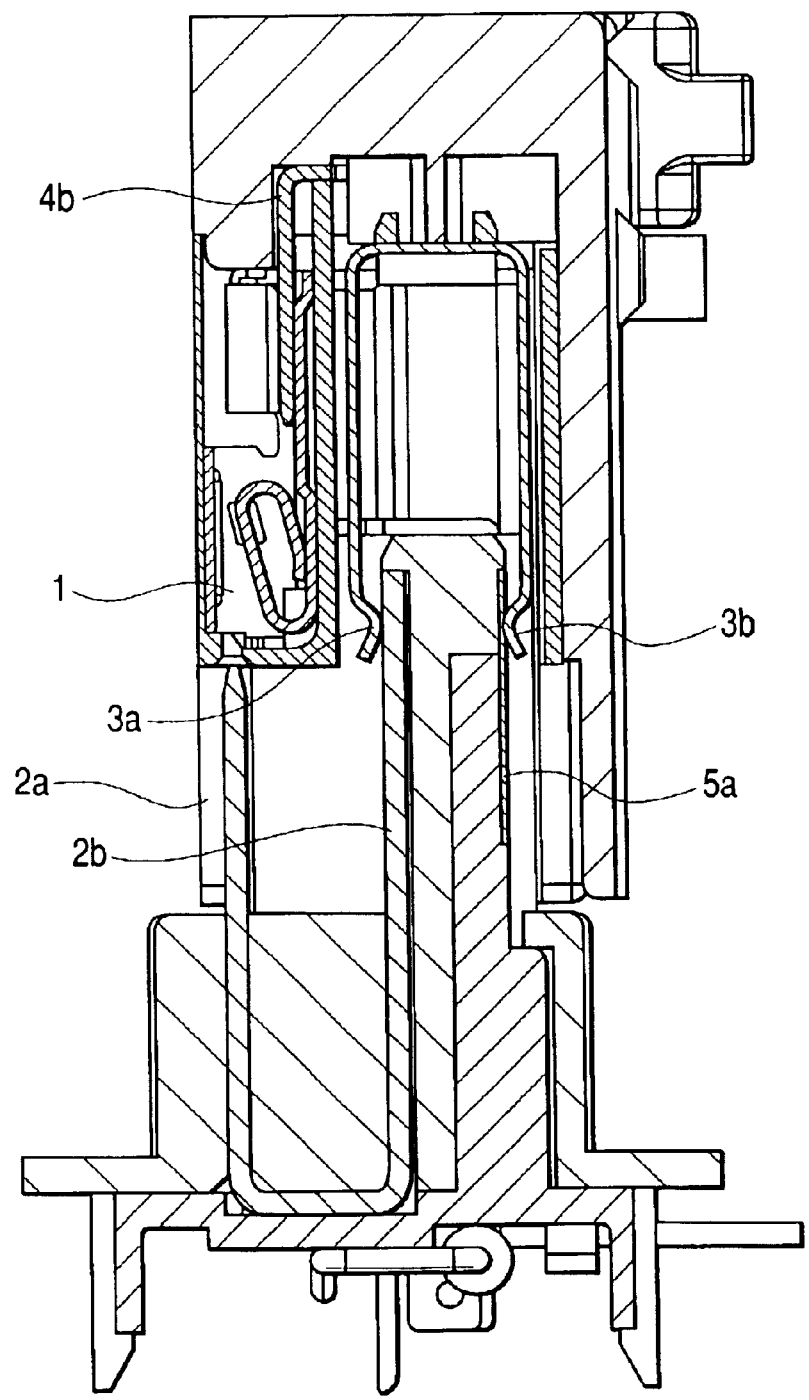
FIG. 26 is a drawing showing a state of the third process (a cross-sectional view taken along the line C—C of FIG. 15).
Figure 27:
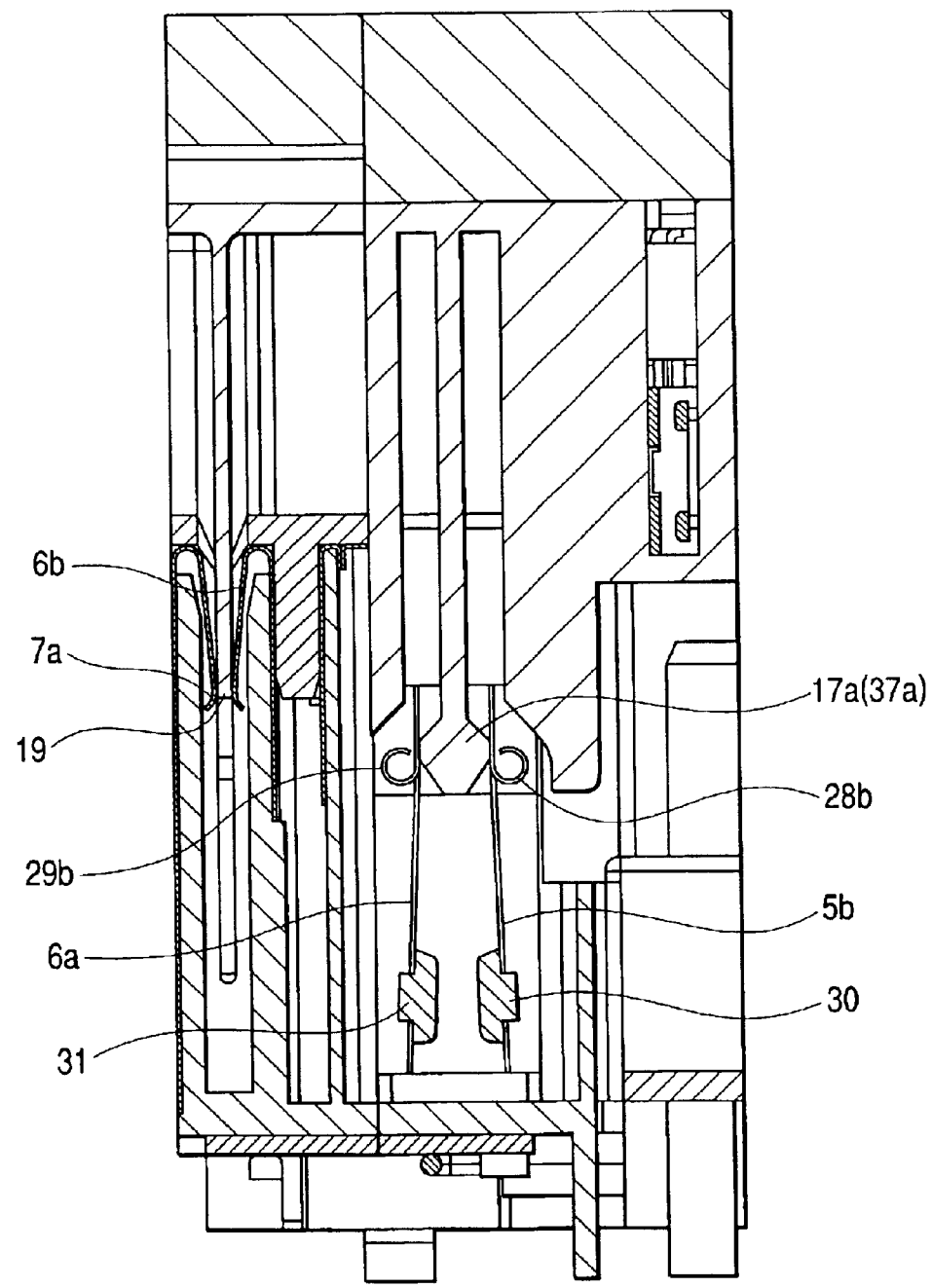
FIG. 27 is a drawing showing a state of the fourth process (a cross-sectional view taken along the line A—A of FIG. 15).
Figure 28:
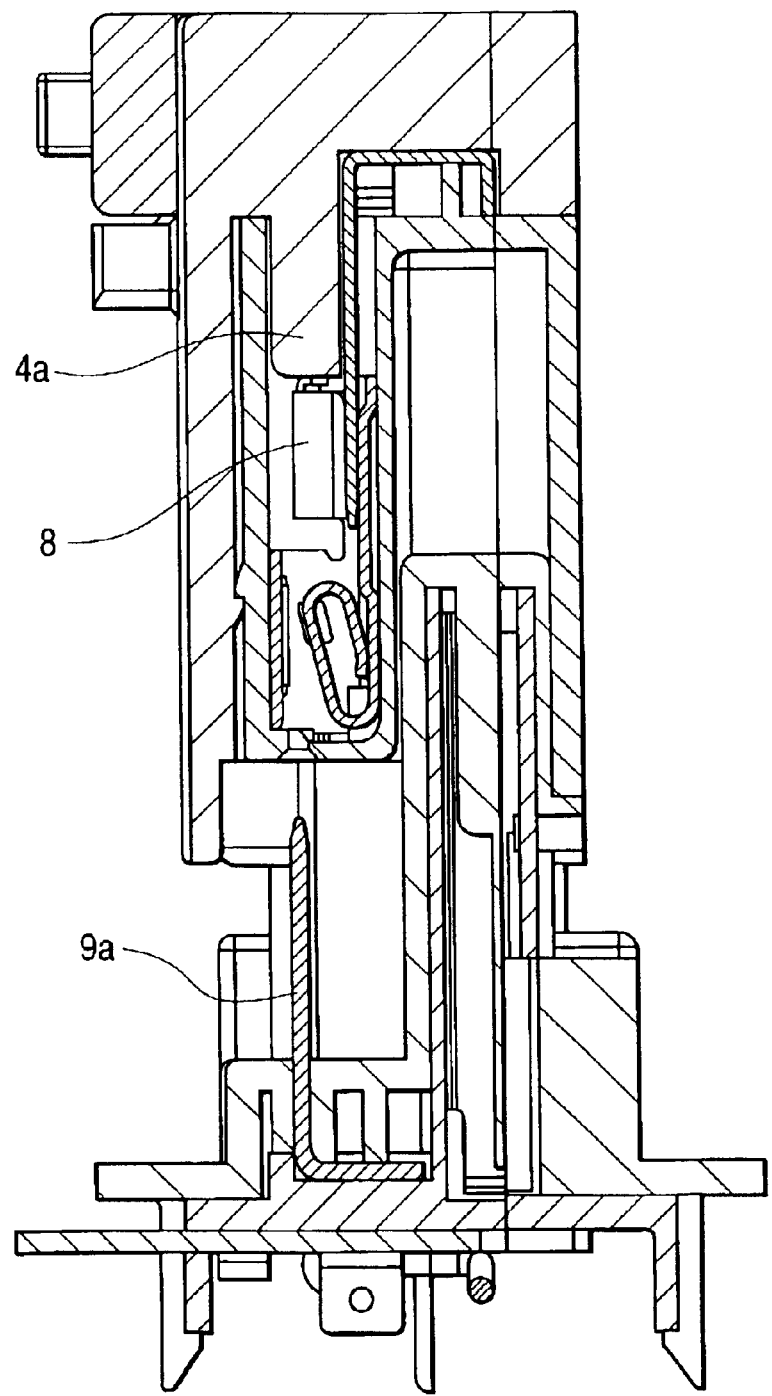
FIG. 28 is a drawing showing a state of the fourth process (a cross-sectional view taken along the line B—B of FIG. 15).
Figure 29:
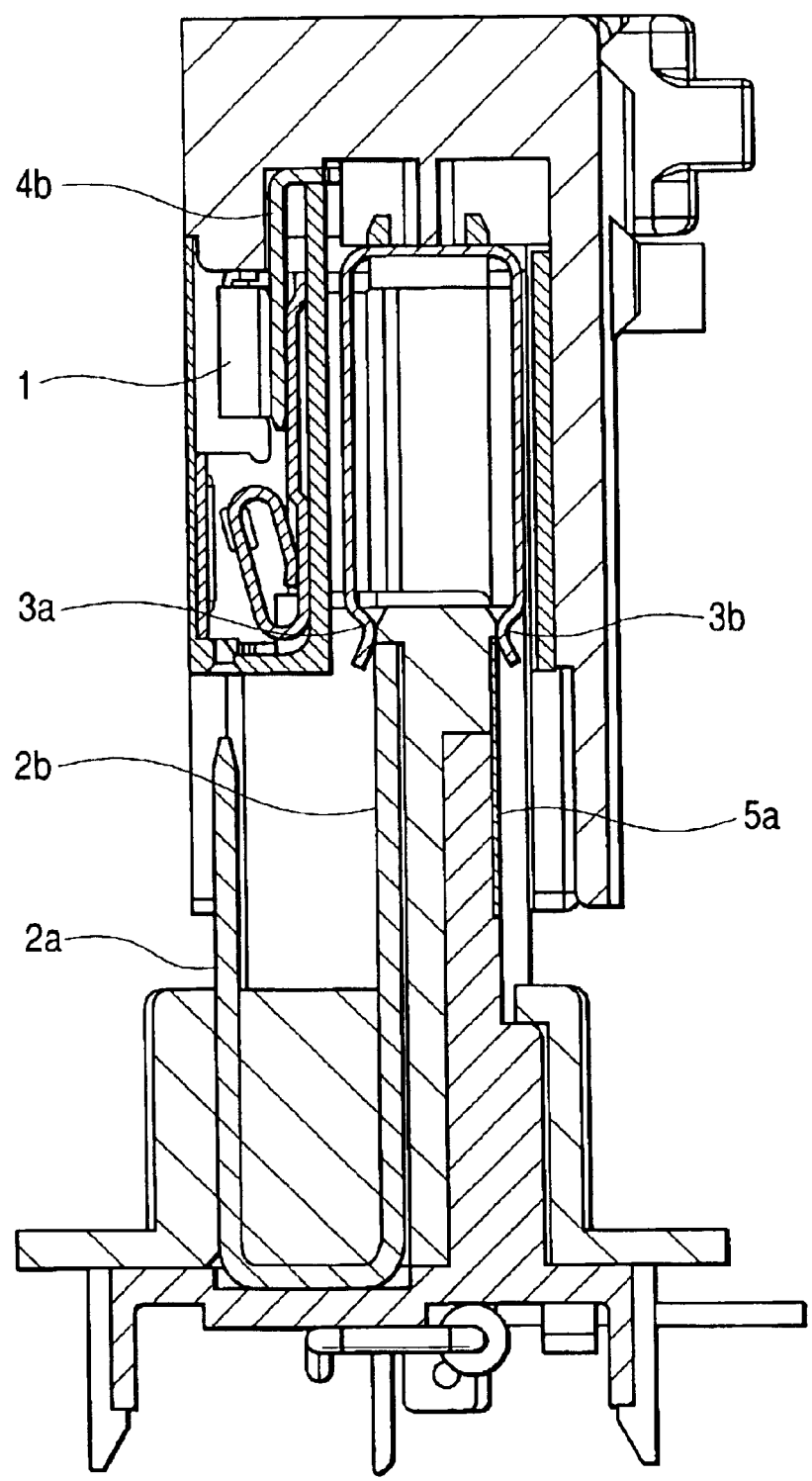
FIG. 29 is a drawing showing a state of the fourth process (a cross-sectional view taken along the line C—C of FIG. 15).
Figure 30:
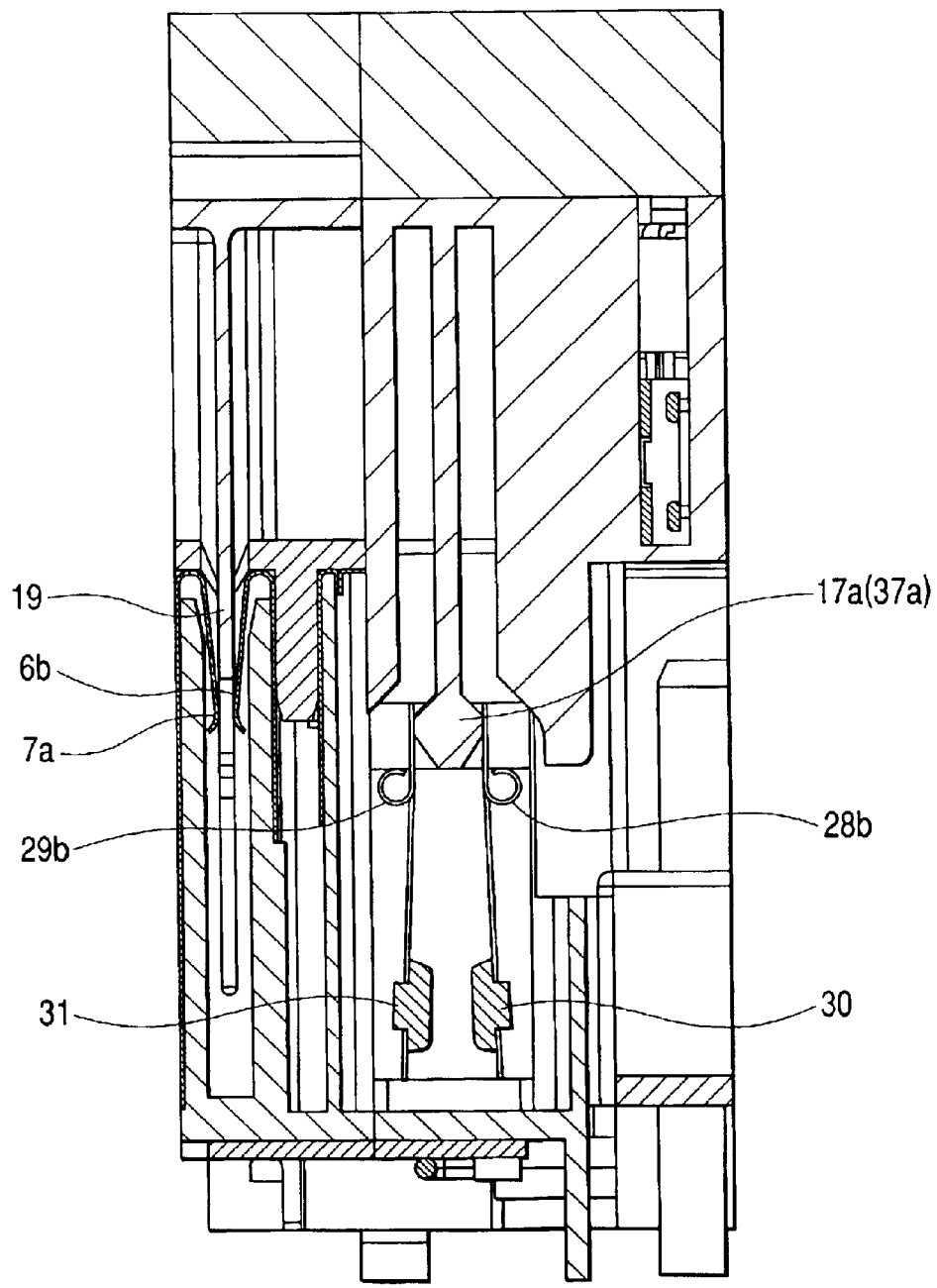
FIG. 30 is a drawing showing a state of the fifth process (a cross-sectional view taken along the line A—A of FIG. 15).
Figure 31:
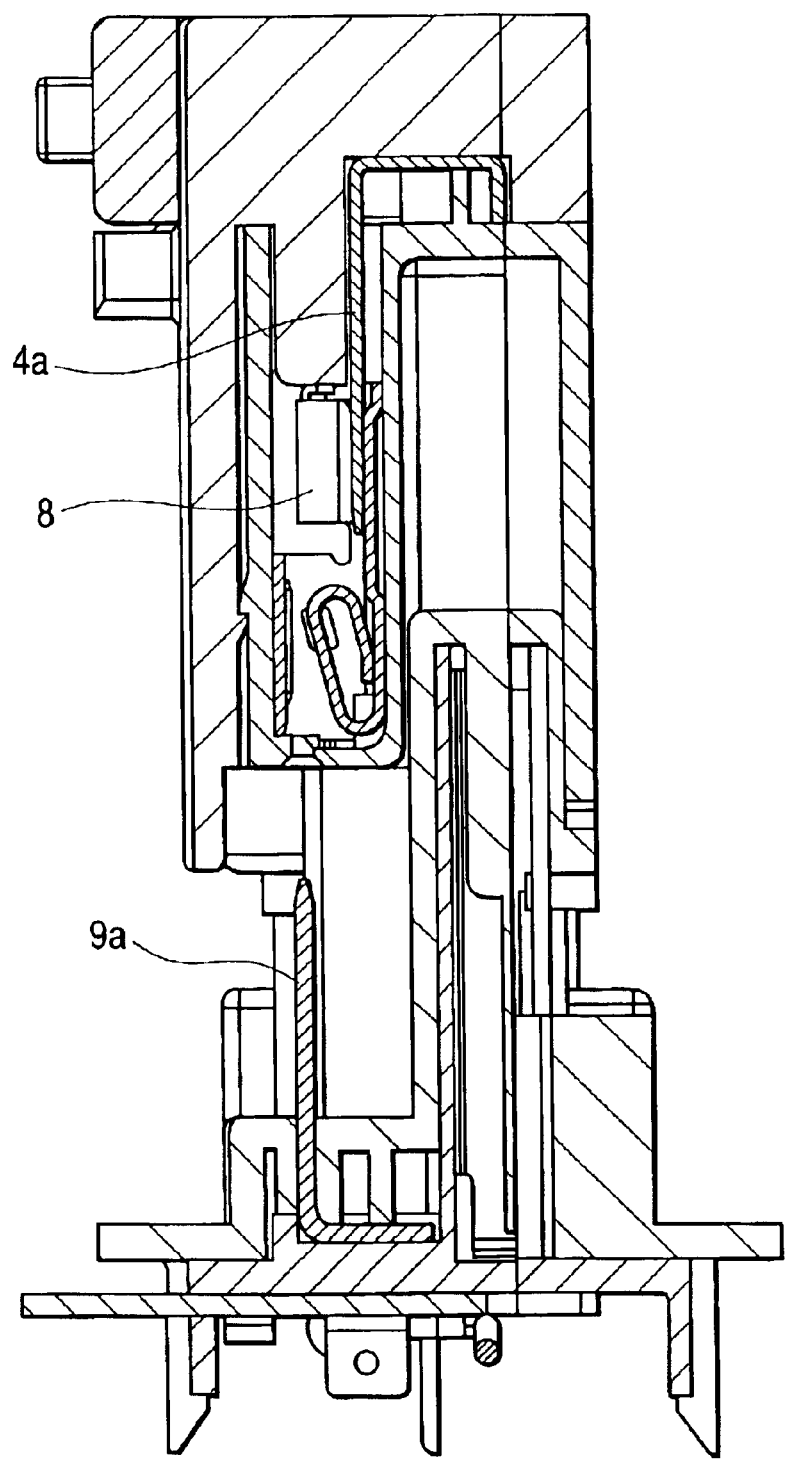
FIG. 31 is a drawing showing a state of the fifth process (a cross-sectional view taken along the line B—B of FIG. 15).
Figure 32:
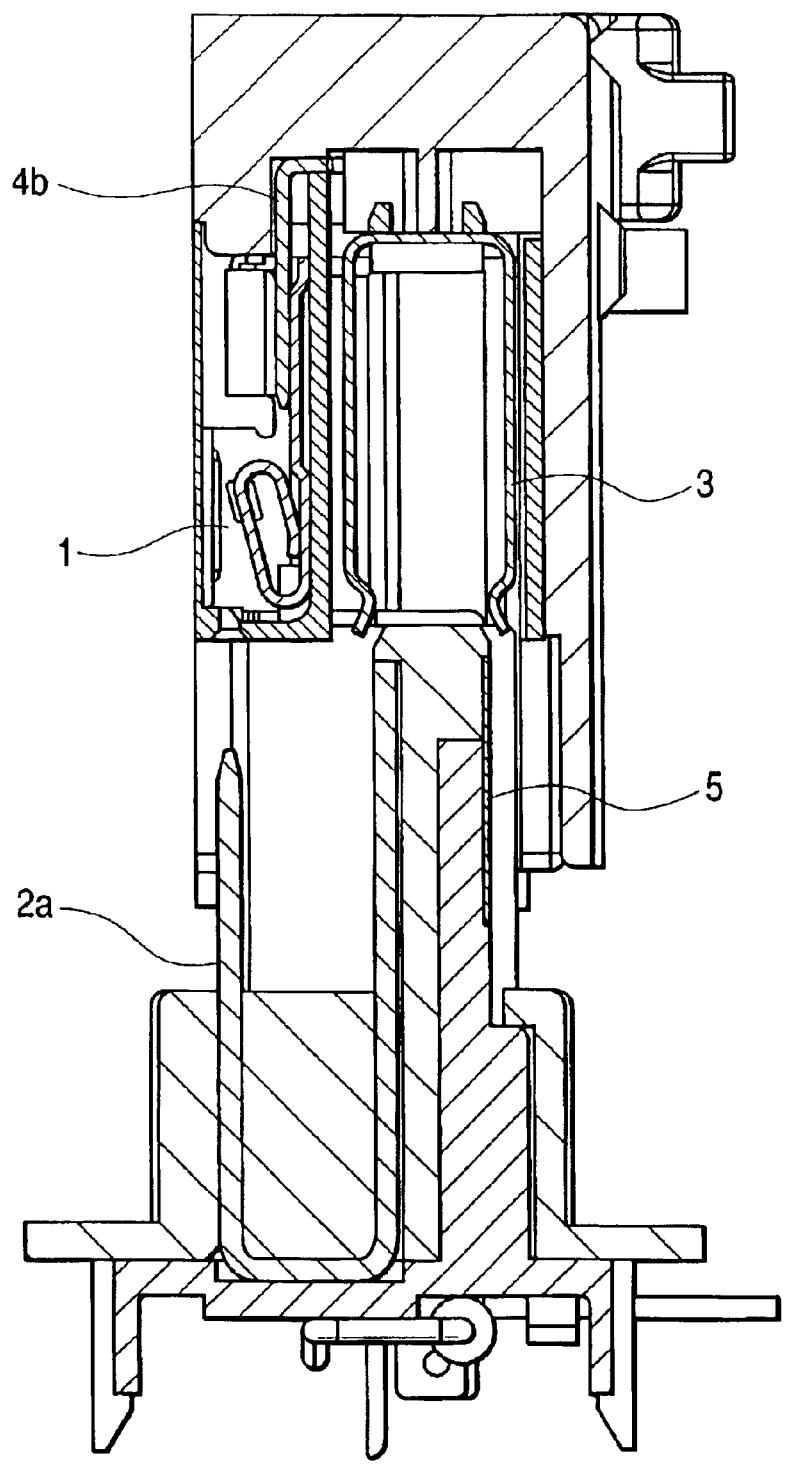
FIG. 32 is a drawing showing a state of the fifth process (a cross-sectional view taken along the line C—C of FIG. 15).
Figure 33:
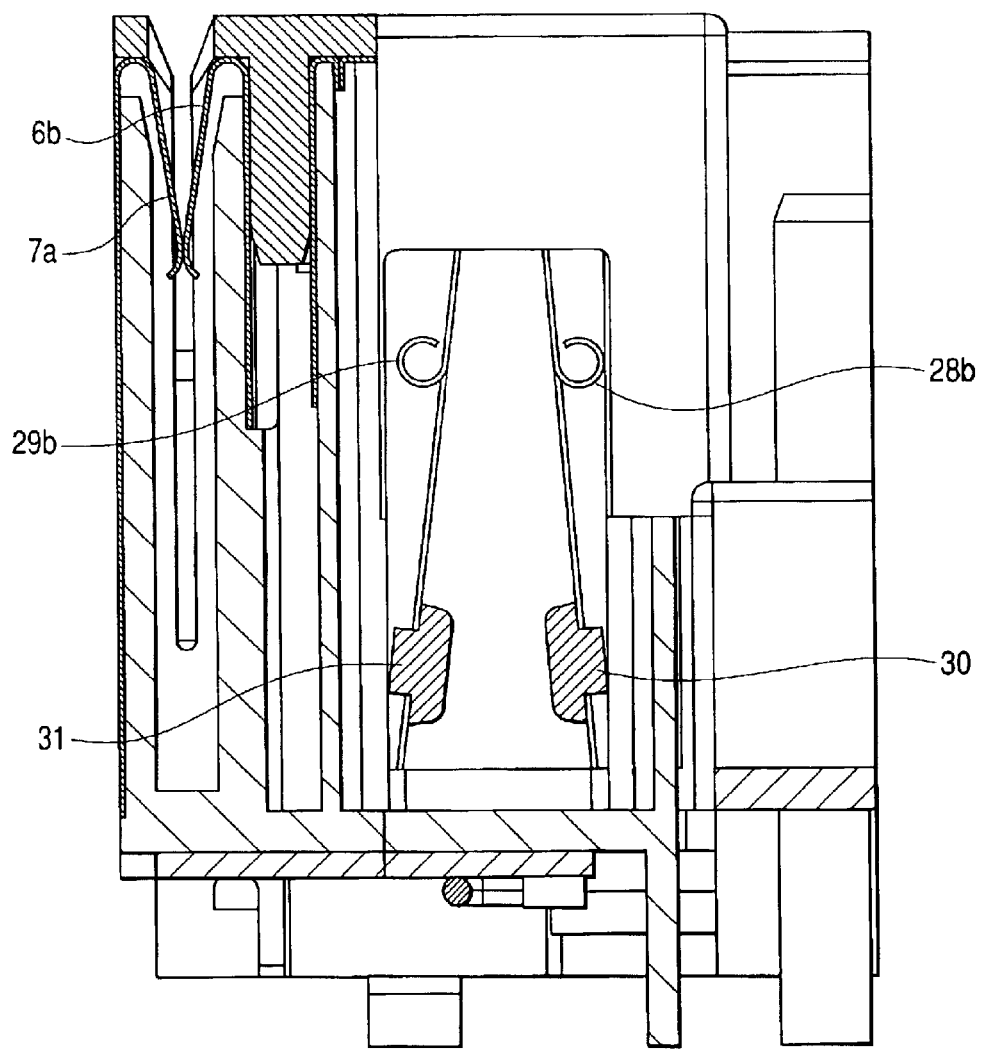
FIG. 33 is a drawing showing a state of the sixth process (a cross-sectional view taken along the line A—A of FIG. 15).
Figure 34:
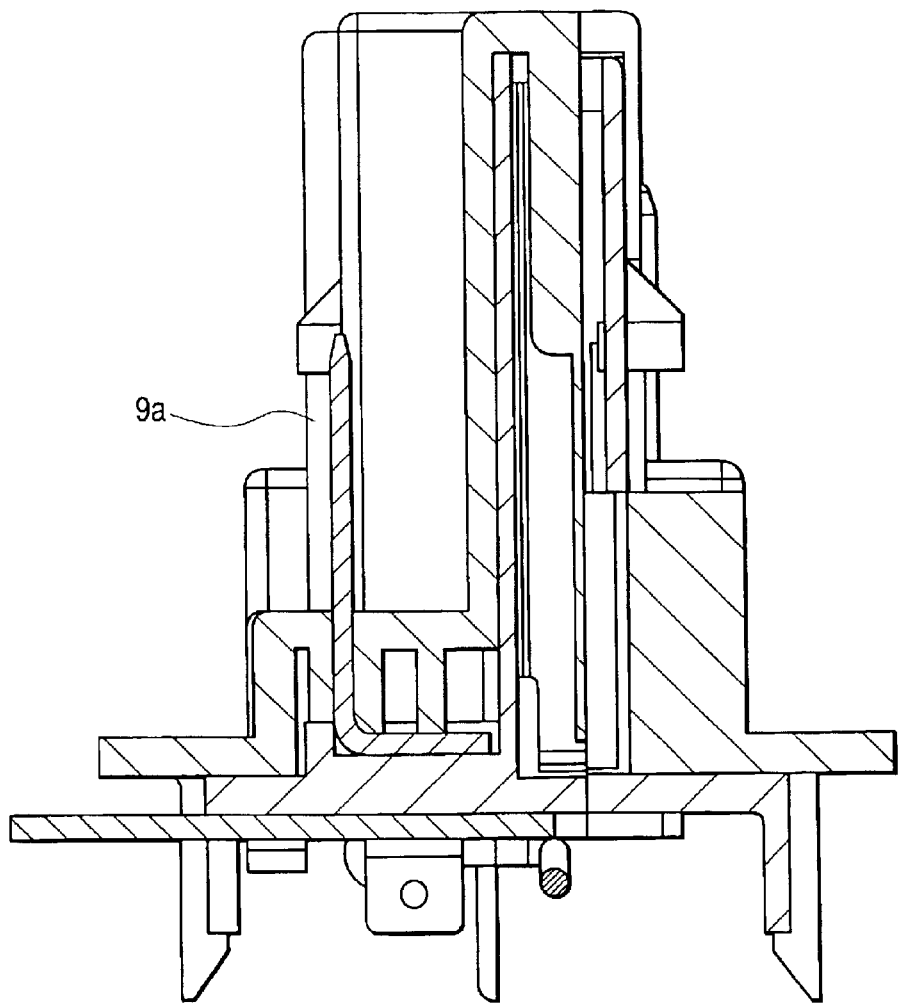
FIG. 34 is a drawing showing a state of the sixth process (a cross-sectional view taken along the line B—B of FIG. 15).
Figure 35:
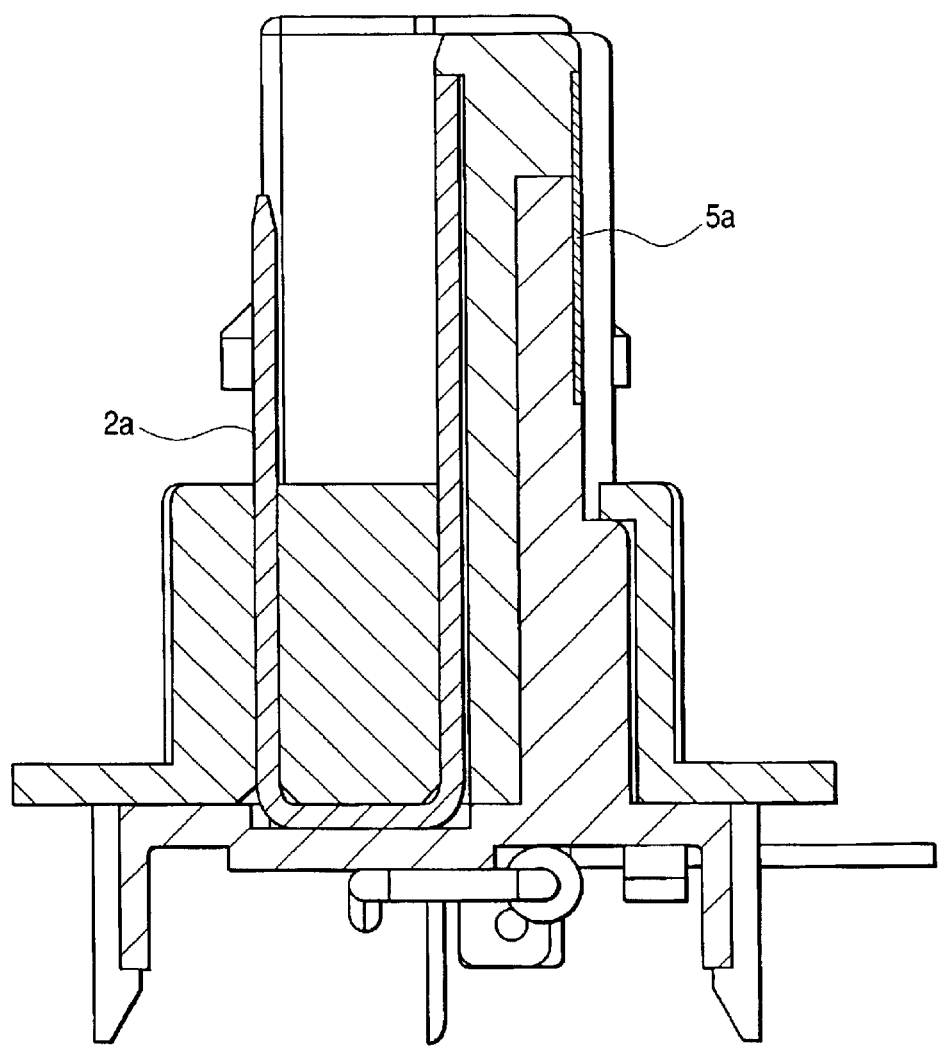
FIG. 35 is a drawing showing a state of the sixth process (a cross-sectional view taken along the line C—C of FIG. 15).

FIGS. 21 to 23 are showing the states under the second process, FIGS. 24 to 26 the states under the third process, FIGS. 27 to 29 the states under the fourth process, FIGS. 30 to 32 the states under the fifth process, and FIGS. 33 to 35 the states under the sixth process. Also, FIGS. 21, 24, 27, 30 and 33 are cross-sectional drawings as FIG. 16 taken along the line A—A of FIG. 15, FIGS. 22, 25, 28, 31 and 34 are cross-sectional drawings as FIG. 17 taken along the line B—B of FIG. 15, and FIGS. 23, 26, 29, 32 and 35 are cross-sectional drawings as FIG. 18 taken along the line C—C of FIG. 15.

In the second process, the terminal 3b is connected with the current switching terminal 5a as shown in FIG. 23, while other connections are similar to the first process, i.e. as shown in FIG. 21 the terminals 6b and 7a are insulated by the descending wall 19; the terminal protecting contacts 30 and 31 are in mutual contact; as shown in FIG. 22 the terminal 4a is connected with the movable side connecting terminal 8, with which the terminal 9a is connected; as shown in FIG. 23 the terminal 4b is connected with the movable side connecting terminal 1, with which the terminal 2a of the input terminal 2 is connected; and the terminal 3a of the connecting conductor 3 is connected with the current switching terminal 2b of the input terminal 2. Therefore, a voltage of the battery 100 is applied to the electric load 101 through the first current pass of the conductive material 4 as in the first process, in addition the input terminal 2 and the electric load 101 are connected through the second current pass consisting of the terminal members 5 and 6 that are connected through the connecting conductor 3 and the terminal protecting contacts 30 and 31 in mutual contact, so that the voltage of the battery 100 is applied to the electric load 101.

In the third process, the terminal 9a comes out of the movable side connecting terminal 8 making a disconnected state as shown in FIG. 25, and the terminal 2a also comes out of the movable side connecting terminal 1 making a disconnected state. Meanwhile, other connections are similar to the second process, i.e. as shown in FIG. 24 the terminals 6b and 7a are insulated by the descending wall 19; the terminal protecting contacts 30 and 31 are in mutual contact; as shown in FIG. 25 the terminal 4a is connected with the movable side connecting terminal 8; as shown in FIG. 26 the terminal 4b is connected with the movable side connecting terminal 1; the terminal 3a of the connecting conductor 3 is connected with the current switching terminal 2b of the input terminal 2; and the terminal 3b of the connecting conductor 3 and the current switching terminal 5a of the terminal member 5 are connected. Accordingly, since the second current pass 15 remains connected though the first current pass becomes disconnected, the voltage of the battery 100 keeps being applied to the electric load 101 through the second current pass 15. Therefore, even though the terminals 2a and 9a are separated from the movable side connecting terminals 1 and 8 at this stage, an arc will not fly between them.

In the fourth process, as the roll sections 28b and 29b (28a and 29a) are guided by the thicker sections 17a (37a) of the descending piece 17 (37) the terminals (spring pieces) 6a and 5b will be more distant from each other, thus separating the terminal protecting contacts 30 and 31 as shown in FIG. 27. Meanwhile other connections are similar to the third process, i.e. as shown in FIG. 27 the terminals 6b and 7a are insulated by the descending wall 19; as shown in FIG. 28 the terminal 4a is connected with the movable side connecting terminal 8, from which the terminal 9a is separated; as shown in FIG. 29 the terminal 4b is connected with the movable side connecting terminal 1, from which the terminal 2a of the input terminal 2 is separated; the terminal 3a of the connecting conductor 3 is connected with the current switching terminal 2b of the input terminal 2; and the terminal 3b of the connecting conductor 3 and the current switching terminal 5a of the terminal member 5 are connected. At the moment that the terminal protecting contacts 30 and 31 separate from each other in this process, an arc will fly in a case where the power is large between the terminal protecting contacts 30 and 31.

In the fifth process, the terminal 3b is come out the upper end of the current switching terminal 5a, and the terminal 3a from the upper end of the current switching terminal 2b as shown in FIG. 32. Meanwhile, other connections are similar to the fourth process, i.e. as shown in FIG. 30 the terminals 6b and 7a are insulated by the descending wall 19; the terminal protecting contacts 30 and 31 are separated; as shown in FIG. 31 the terminal 4a is connected with the movable side connecting terminal 8, from which the terminal 9a is separated; and as shown in FIG. 32 the terminal 4b is connected with the movable side connecting terminal 1.

In the sixth process, the terminals 6b and 7a contact with each other so that a voltage stored in the condenser 21 is discharged through the discharge resistance 103 as shown in FIG. 33. Meanwhile, other connections are similar to the fifth process, i.e. as shown in FIG. 33 the terminals 6b and 7a are in mutual contact; the terminal protecting contacts 30 and 31 are separated; as shown in FIG. 34 the terminal 9a is separated from the movable side connecting terminal 8; as shown in FIG. 35 the terminal 2a of the input terminal 2 is separated from the movable side connecting terminal 1. Also, the terminal 4a and the movable side connecting terminal 8 are connected, and the terminal 4b and the movable side connecting terminal 1 are connected as well.

Now according to the foregoing embodiment, in a state where the movable member 12 is attached to the fixed member 11 with the input terminal 2 connected with the on-vehicle power source 100 and the output terminal 9 with each electric load 101 respectively, the input terminal 2 and the output terminal 9 become connected through the first current pass (conductive material 4) in the movable member 12, so that power is supplied to each electric load 101. At this stage, though the terminal protecting contacts 30 and 31 are contacting with each other, since the second current pass 15 is disconnected by the current switching means 13 the power is supplied exclusively through the first current pass 4. In a state where the movable member 12 begins to be removed under this state, first the second current pass is turned on by the current switching means 13, so that the power source 100 and the electric load 101 become connected through the first current pass 4 as well as second current pass 15. Then the movable side connecting terminals 1 and 8 are separated from the input terminal 2 and output terminal 9 to disconnect the first current pass, at which time since the power source 100 and the electric load 101 remain connected through the second current pass 15 an arc will not fly between the input terminal 2 and the output terminal 9 and the movable side connecting terminals 1 and 8, therefore these terminals 1, 2, 8 and 9 are effectively protected. Following this the terminal protecting contacts 30 and 31 become separated, at which moment an arc will fly between the terminal protecting contacts 30 and 31 in a case where the power is large. Consequently, if an arc ever flies it is only between the terminal protecting contacts 30 and 31, and an arc will not fly between the input terminal 2 and output terminal 9 and the movable connecting terminals 1 and 8 therefore these terminals 1, 2, 8 and 9 are securely protected. Accordingly, the protecting device also provides a solution for increasing voltage of the power source.

Also, according to this embodiment since the terminal protecting contacts 30 and 31 are made of a material that has a greater art resistance than the input terminal 2 and the output terminal 9, the terminal protecting contacts 30 and 31 can be used for a prolonged period with less frequency of maintenance works. Here, materials with a greater arc resistance have a greater resistance than materials generally used for electric connection (such as copper), however, since the second current pass 15 is disconnected by the current switching means 13 and power is supplied to each electric load 101 exclusively through the first current pass 4 in a state where the movable member 12 is attached to the fixed member 11, a greater resistance of the terminal protecting contacts will not cause any problem with the power supply.

Also, according to this embodiment since a condenser 102 is provided in parallel with the terminal protecting contacts 30 and 31, arc discharge between the terminal protecting contacts 30 and 31 can be restrained by a condensing effect of the condenser 102, and resultantly the life span of the contacts 30 and 31 can be prolonged. In this case also, since the second current pass 15 including the condenser 102 is disconnected by the current switching means 13 while the power is supplied to each electric load 101, there will be no disturbance in the power supply.

Also, according to this embodiment, for keeping the terminal protecting contacts 30 and 31 separated the contacts 30 and 31 are disposed on elastically deformable spring pieces (terminals 5b and 6a) formed in such a manner that the terminal protecting contacts 30 and 31 remain separated in a natural state here an external force is not applied to the spring pieces 5b and 6a, and the operating section 48 is formed so as to cause elastic deformation of the spring pieces 5b and 6a in a state where the movable member 12 is attached to the fixed member 11 to force the terminal protecting contacts 30 and 31 to contact with each other, therefore in a state where the movable member 12 is not attached to the fixed member 11 the terminal protecting contacts 30 and 31 remain separated due to the natural shape of each spring piece 5b and 6a. In addition, since the mutual contact of the terminal protecting contacts 30 and 31 can be forcibly achieved by the operating section 48 that causes the elastic deformation in a state where attaching the movable member 12 to the fixed member 11, on and off control of the contacts 30 and 31 can be mechanically performed by the operating section 48, without employing an electric circuit such as an electromagnetic relay.

Also, according to this embodiment the current switching means 13 consists of a pair of current switching terminals 2b and 5a that are separated and included in the second current pass 15, and a connecting conductor 3 located on the movable member 12 that becomes separated from one of the current switching terminals 5a when the movable member 12 is attached to the fixed member 11 but that contacts with both of the current switching terminals 2b and 5a to achieve electric connection between the current switching terminals 2b and 5a at least in a state where the terminal protecting contacts 30 and 31 begin to separate from each other, therefore current switching operation on the second current pass 15 can be properly performed by a simple construction of only a pair of current switching terminals 2b and 5a and a connecting conductor 3 that can contact with and separate from the current switching terminals 2b and 5a.

Further, according to the foregoing embodiment each of the input terminal 2, connecting conductor 3, conductive material 4, terminal member 5, terminal member 6, terminal member 7 and output terminal 9 is constructed of a plurality of terminals unified into one body, however, the invention is not limited to such a construction. It is also possible to form any of the terminals among these terminal members as a separate component, and to connect it to other components by welding etc., or by wiring. Specifically, referring to the terminal members 5 and 6, it is also preferable to employ a spring material only for the portion to which the terminal protecting contacts 30 and 31 are to be attached and to connect such spring portions with other components in the above-mentioned way. In addition, the material of the spring piece is not limited to phosphor bronze.

Further, according to the foregoing embodiment the current switching means 13 is provided on the side of the battery 100 and the first contacting means 14 on the side of the electric load 101, however, the invention can naturally be arranged conversely to provide the current switching means 13 on the side of the electric load 101 and the first contacting means 14 on the side of the battery 100.

Figure 36A:
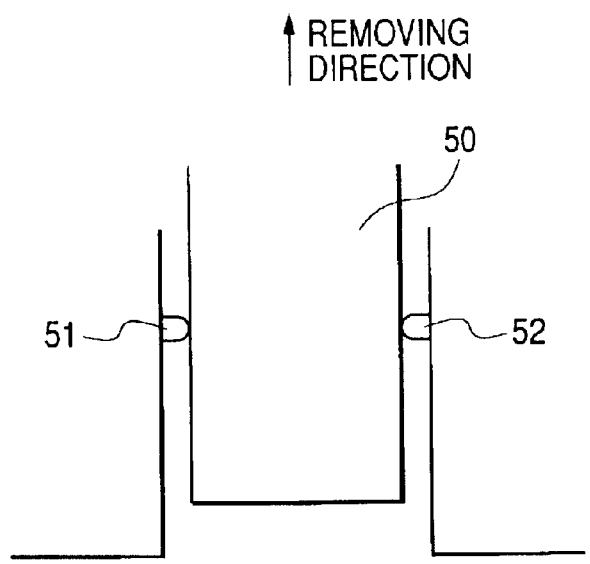
FIGS. 36A and 36B are schematic drawings showing another configuration according to the invention.
Figure 36B:
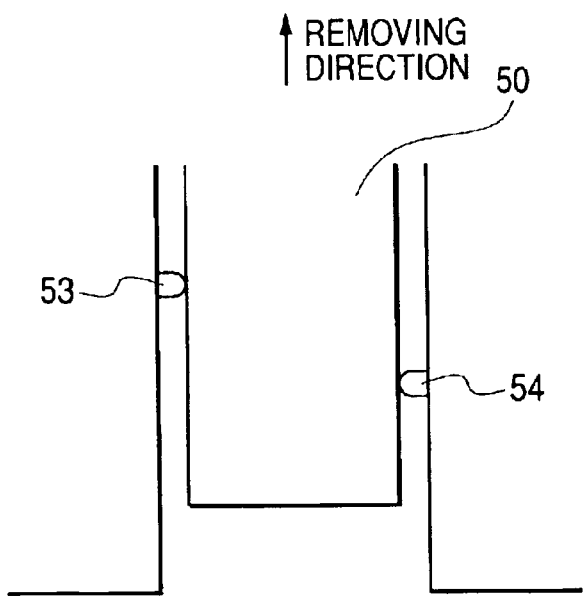

Further, according to the invention the first contacting means 14 can also be constructed so that one or more pairs of contacts become separated while the movable member 13 is being removed from the fixed member 11, like the current switching means 13. For example, as shown in FIG. 36A, it is also preferable to dispose a pair of confronting fixed side contacts 51 and 52 on the fixed member and a block-type contact 50 made of a material that has a high arc resistance on the movable member to be inserted between the contacts 51 and 52, so that an arc will fly between the contacts 50 and 51 as well as between the contacts 50 and 52 at the moment that the contact 50 is separated from the fixed side contacts 51 and 52. Otherwise, as shown in FIG. 36B, it is also preferable to dispose a pair of fixed side contacts 53 and 54 with a level gap on the fixed member and a block-type contact 50 made of a material that has a high arc resistance on the movable member to be inserted between the contacts 53 and 54 of different positions, so that an arc will fly between the contacts 50 and 54 at the moment that the contact 50 is separated from the lower fixed side contact 54 that first becomes disconnected.

As described above in detail, according to the invention, when a movable member is attached to a fixed member with an input terminal connected with an on-vehicle power source and an output terminal with each electric load respectively, the input terminal and the output terminal become connected through the first current pass in the movable member side, so that power is supplied to each electric load. At this stage, though two terminal protecting contacts are contacting with each other, since the second current pass is disconnected by means for switching current the power is supplied exclusively through the first current pass. When the movable member begins to be removed under this state, first the second current pass is turned on by the current switching means, so that the power source and the electric load become connected through the first current pass as well as the second current pass, after which the movable side connecting terminals are separated from the input terminal and output terminal to disconnect the first current pass, however, at this moment since the power source and the electric load remain connected through the second current pass an arc will not fly between the input and output terminals and the movable side connecting terminals, therefore these terminals are effectively protected. Following this the terminal protecting contacts become separated from each other, at which moment an arc will fly between the terminal protecting contacts in a case where the power is large, in other words if an arc ever flies it is only between the terminal protecting contacts and an arc will not fly between the input and output terminals and the movable connecting terminals, therefore these terminals are securely protected. Accordingly, the protecting device also provides a solution for increasing voltage of the power source.

What is claimed is:

1. A protecting device comprising:

a fixed member to be fixed on a vehicle, a movable member that is attached to or removed from said fixed member for cutting off power supply from an on-vehicle power source to each electric load by removing said movable member from said fixed member, said fixed member including an input terminal to be connected to said on-vehicle power source and an output terminal to be connected to each electric load;

said movable member including a first current pass having movable side connecting terminals on ends thereof to be respectively connected to said input terminal and said output terminal in a state where said movable member is attached to said fixed member;

said fixed member including a second current pass for connecting said input terminal with said output terminal separately from said first current pass, said second current pass including terminal protecting contacts during midstream that contact with each other, and current switching means provided for cutting off a current said second current pass in a state where said movable member is attached to said fixed member, and for passing a current through said second current pass while said movable member is being removed from said fixed member and before said input terminal and said output terminal are separated from said movable side connecting terminals; wherein said terminal protecting contacts contact with each other in a state where said movable member is attached to said fixed member, and separate from each other while said movable member is being removed from said fixed member and after said current switching means switches on said second current pass.

2. The protecting device as set forth in claim 1, wherein said terminal protecting contacts are made of a material that has a greater arc resistance than said input terminal and said output terminal.

3. The protecting device as set forth in claim 1, further comprising:

a condenser in parallel with said terminal protecting contacts.

4. The protecting device as set forth in claim 1, wherein said terminal protecting contacts are disposed on elastically deformable spring pieces formed in such a manner that said terminal protecting contacts remain separated in a natural state where an external force is not subjected to said spring pieces, and said movable member includes an operating section that forces said terminal protecting contacts to contact with each other in a state where said movable member is attached to said fixed member.

5. The protecting device as set forth in claim 1, wherein said current switching means comprising:

a pair of current switching terminals that are separated from each other located on said second current pass, and a connecting conductor located on said movable member that is separated from at least one of said current switching terminals in a state where said movable member is attached to said fixed member, and contacts with said both current switching terminals at least when said terminal protecting contacts separate from each other, to achieve electric connection between said current switching terminals.

* * * * *